(12) United States Patent
Nangare

(10) Patent No.: US 11,450,348 B2
(45) Date of Patent: Sep. 20, 2022

(54) HEALTH MANAGEMENT FOR MAGNETIC STORAGE MEDIA

(71) Applicant: Marvell Asia Pte, Ltd., Singapore (SG)

(72) Inventor: Nitin Nangare, Sunnyvale, CA (US)

(73) Assignee: Marvell Asia PTE, Ltd., Singapore (SG)

( * ) Notice: Subject to any disclaimer, the term of this patent is extended or adjusted under 35 U.S.C. 154(b) by 239 days.

(21) Appl. No.: 16/737,174

(22) Filed: Jan. 8, 2020

(65) Prior Publication Data

US 2020/0251143 A1 Aug. 6, 2020

Related U.S. Application Data

(60) Provisional application No. 62/799,608, filed on Jan. 31, 2019.

(51) Int. Cl.
*G06F 3/06* (2006.01)
*G06N 3/08* (2006.01)
(Continued)

(52) U.S. Cl.
CPC ............ *G11B 20/18* (2013.01); *G06F 3/0619* (2013.01); *G06F 3/0653* (2013.01);
(Continued)

(58) Field of Classification Search
CPC .............. G11B 20/18; G11B 20/10518; G11B 2020/1869; G06F 3/0619; G06F 3/0653; G06F 3/0676; G06N 3/08
See application file for complete search history.

(56) References Cited

U.S. PATENT DOCUMENTS 4,553,178 A 11/1985 Lynch
5,420,730 A 5/1995 Moon et al.
(Continued)

FOREIGN PATENT DOCUMENTS

CN 1122926 5/1996
CN 1166674 12/1997
(Continued)

OTHER PUBLICATIONS

"International Preliminary Report on Patentability", Application No. PCT/IB2020/051657, dated Aug. 25, 2021, 8 pages.
(Continued)

*Primary Examiner* — Mark A Giardino, Jr.

(57) ABSTRACT

The present disclosure describes aspects of health management for magnetic storage media. In some aspects, a media health manager determines, with a read channel, read metrics for a sector of magnetic storage media that resides in a zone of magnetic storage media. The media health manager accesses read metrics of the zone and updates the read metrics of the zone based on the read metrics determined for the sector to provide updated read metrics for the zone of magnetic storage media. A health score for the zone of magnetic storage media is then determined with a neural network based on the updated read metrics of the zone of magnetic storage media. By so doing, gradual wear of the magnetic storage media may be predicted using the health score, enabling replacement of a magnetic storage media device before failure to improve reliability or availability of data stored to the device.

20 Claims, 11 Drawing Sheets

(51) Int. Cl.
*G11B 20/18* (2006.01)
*G11B 20/10* (2006.01)

(52) U.S. Cl.
CPC .............. *G06F 3/0676* (2013.01); *G06N 3/08* (2013.01); *G11B 20/10518* (2013.01); *G11B 2020/1869* (2013.01)

(56) References Cited

U.S. PATENT DOCUMENTS

| | | | |
|---|---|---|---|
| 5,535,067 | A | 7/1996 | Rooke |
| 5,636,075 | A | 6/1997 | Nishimura et al. |
| 6,023,386 | A | 2/2000 | Reed et al. |
| 6,175,319 | B1 | 1/2001 | Schneider et al. |
| 6,449,112 | B1 | 9/2002 | Wursthorn et al. |
| 6,501,610 | B1 | 12/2002 | Sugawara et al. |
| 6,574,754 | B1* | 6/2003 | Smith .................. G11B 27/36 706/26 |
| 7,236,911 | B1 | 6/2007 | Gough et al. |
| 8,508,878 | B1 | 8/2013 | Zou et al. |
| 8,508,879 | B1 | 8/2013 | Zou et al. |
| 8,749,911 | B1 | 6/2014 | Sun et al. |
| 8,792,197 | B1 | 7/2014 | Wilson et al. |
| 8,873,181 | B1 | 10/2014 | Zou et al. |
| 8,929,013 | B1 | 1/2015 | Mastrocola et al. |
| 9,059,737 | B2 | 6/2015 | Coker et al. |
| 9,281,009 | B1 | 3/2016 | Burton et al. |
| 9,530,447 | B2 | 12/2016 | Gao et al. |
| 10,068,609 | B1 | 9/2018 | Mostafa et al. |
| 10,115,415 | B1 | 10/2018 | Tang et al. |
| 10,276,198 | B1 | 4/2019 | Katchmart et al. |
| 10,734,016 | B2 | 8/2020 | Oberg et al. |
| 10,971,187 | B2 | 4/2021 | Katchmart |
| 10,984,822 | B2 | 4/2021 | Oberg et al. |
| 11,061,582 | B2 | 7/2021 | Oberg |
| 11,270,723 | B2 | 3/2022 | Oberg et al. |
| 2003/0002187 | A1 | 1/2003 | Ko et al. |
| 2004/0201913 | A1 | 10/2004 | Sutardja |
| 2007/0159870 | A1 | 7/2007 | Tanizaki et al. |
| 2007/0165320 | A1 | 7/2007 | Benakli et al. |
| 2010/0241922 | A1 | 9/2010 | Furuhashi et al. |
| 2013/0141818 | A1 | 6/2013 | Sinclair et al. |
| 2014/0244926 | A1 | 8/2014 | Yang et al. |
| 2014/0268396 | A1 | 9/2014 | Shaver et al. |
| 2015/0062738 | A1 | 3/2015 | Yang |
| 2015/0213813 | A1 | 7/2015 | Lammers et al. |
| 2017/0270963 | A1 | 9/2017 | Maeto |
| 2018/0060192 | A1 | 3/2018 | Eggert et al. |
| 2018/0081571 | A1* | 3/2018 | Akshara ................ G06F 3/0653 |
| 2018/0095665 | A1* | 4/2018 | Xu ........................ G06F 3/0644 |
| 2020/0066299 | A1 | 2/2020 | Oberg et al. |
| 2020/0202893 | A1 | 6/2020 | Katchmart |
| 2020/0272339 | A1 | 8/2020 | Oberg |
| 2020/0294549 | A1 | 9/2020 | Katchmart |
| 2020/0342900 | A1 | 10/2020 | Oberg et al. |
| 2021/0241789 | A1 | 8/2021 | Oberg et al. |
| 2022/0189504 | A1 | 6/2022 | Oberg et al. |

FOREIGN PATENT DOCUMENTS

| | | |
|---|---|---|
| CN | 1286790 | 3/2001 |
| CN | 1354462 | 6/2002 |
| CN | 1750160 | 3/2006 |
| CN | 105719667 | 6/2016 |
| JP | S60185258 | 9/1985 |
| JP | H08287618 | 11/1996 |
| JP | 10255402 | 9/1998 |
| JP | 2006031825 | 2/2006 |
| KR | 20010018400 | 3/2001 |
| WO | 2020174426 | 9/2020 |
| WO | 2020185792 | 9/2020 |

OTHER PUBLICATIONS

"Pre-Interview Communication", U.S. Appl. No. 16/812,960, dated Oct. 2, 2020, 7 pages.

"Correceted Notice of Allowance", U.S. Appl. No. 16/812,960, dated Mar. 4, 2021, 2 pages.

"Corrected Notice of Allowance", U.S. Appl. No. 16/928,971, dated Mar. 11, 2021, 2 pages.

"Notice of Allowance", U.S. Appl. No. 16/801,506, dated Mar. 31, 2021, 8 pages.

"Foreign Office Action", EP Application No. 20154549.8, dated Jan. 4, 2022, 6 pages.

"Foreign Office Action", EP Application No. 19192790.4, dated Oct. 21, 2021, 5 pages.

"Notice of Allowance", U.S. Appl. No. 17/234,557, dated Nov. 1, 2021, 9 pages.

"International Preliminary Report on Patentability", PCT Application No. PCT/US2020/021911, dated Dec. 3, 2020, 6 pages.

"Notice of Allowance", U.S. Appl. No. 16/812,960, dated Dec. 9, 2020, 5 pages.

"Notice of Allowance", U.S. Appl. No. 16/928,971, dated Dec. 16, 2020, 8 pages.

"Extended European Search Report", European Application No. 19192790.4, dated Jan. 3, 2020, 7 pages.

"Extended European Search Report", European Application No. 20154549.8, dated Jul. 2, 2020, 6 pages.

"International Search Report and Written Opinion", PCT Application No. PCT/IB2020/051657, dated May 19, 2020, 14 pages.

"International Search Report and Written Opinion", PCT Application No. PCT/US2020/021911, dated Jun. 2, 2020, 13 pages.

"Notice of Allowance", U.S. Appl. No. 16/545,966, dated Mar. 23, 2020, 7 Pages.

"Run-Length Limited", URL: https://en.wikipedia.org/wiki/Run-length_limited, Oct. 18, 2019, 10 pages.

Xu, et al., "Health Status Assessment and Failure Prediction for Hard Drives with Recurrent Neural Networks", IEEE Transactions on Computers, vol. 65, No. 11, Nov. 2016, Nov. 2016, 7 pages.

"Foreign Office Action", CN Application No. 201910777843.5, dated Mar. 16, 2022, 8 pages.

"Foreign Office Action", CN Application No. 202080016636.9, dated Mar. 21, 2022, 17 pages.

* cited by examiner

HEALTH MANAGEMENT FOR MAGNETIC STORAGE MEDIA

CROSS REFERENCE TO RELATED APPLICATION

This present disclosure claims priority to U.S. Provisional Patent Application Ser. No. 62/799,608 filed Jan. 31, 2019, the disclosure of which is incorporated by reference herein in its entirety.

BACKGROUND

Electronic devices provide many services to modern society. These services enable an electronic device to provide entertainment, assist with scientific research and development, and provide many modern-day conveniences. Many of these services create or use data, which the electronic device stores. This data may include digital media such as books or movies, algorithms that execute complex simulations, personal user data, applications, and so forth. To avoid exceeding data storage limits, it is beneficial to increase the data storage capacity of the electronic device and avoid deleting data, limiting services, or purchasing additional external storage devices.

Many electronic devices use media drives to store data on disks, such as a hard-disk drive (HDD). Generally, data stored to a HDD is accessed by moving a read element or write element across a surface of a media disk as the disk rotates at high speed. As such, HDDs are a complex system of interlinked mechanical, electrical, and magnetic parts that operate in concert to facilitate the storage and access of data. Outside of catastrophic events, such as being dropped, these mechanical, electrical, and magnetic parts of the HDD wear gradually during the operating life of the HDD until a critical failure of one of the parts prevents data access. Without knowing how much of this wear has occurred over time, a HDD may fail unexpectedly before replacement or data backup, resulting in the loss of data or reduced uptime of data storage services.

SUMMARY

This summary is provided to introduce subject matter that is further described in the Detailed Description and Drawings. Accordingly, this Summary should not be considered to describe essential features nor used to limit the scope of the claimed subject matter.

In some aspects, a media health manager of magnetic storage media implements a method that receives a request to read a sector of magnetic storage media that resides in a zone of magnetic storage media. The method determines, with a read channel, read metrics for the sector of the magnetic storage media that is read based on the request. The method includes accessing read metrics of the zone of magnetic storage media and updating the read metrics of the zone based on the read metrics determined for the sector to provide updated read metrics for the zone of magnetic storage media. The method then determines, with a neural network, a health score for the zone of magnetic storage media based on the updated read metrics of the zone of magnetic storage media.

In other aspects, an apparatus comprises an interface to communicate data with a host, a disk of magnetic storage media to store the data, a read channel to read the data from sectors of the magnetic storage media, and a neural network to determine media health scores. The apparatus also includes a media health manager configured to determine, with the read channel, read metrics for a sector of the magnetic storage media from which the data is read. The media health manager may also determine, from multiple zones of magnetic storage media, a zone of magnetic storage media in which the sector resides. Each zone of magnetic storage media may correspond to a respective subset of tracks on the disk of magnetic storage media. The media health manager accesses read metrics of the zone of magnetic storage media and updates the read metrics of the zone based on the read metrics determined for the sector to provide updated read metrics for the zone of magnetic storage media. The media health manager then determines, with the neural network, a health score for the zone of magnetic storage media based on the updated read metrics of the zone of magnetic storage media.

In yet other aspects, a System-on-Chip (SoC) is described that includes a pre-amplifier interface to receive signals corresponding to data read from sectors of magnetic storage media. The SoC also includes read channel logic to process the signals corresponding to the data read from the sectors of magnetic storage media, a hardware-based processor, and a memory storing processor-executable instructions to implement a media health manager. The media health manager determines, with the read channel logic, read metrics for a sector of the magnetic storage media from which the data is read. The media health manager may also determine, from multiple zones of magnetic storage media, a zone of magnetic storage media in which the sector resides. Each zone of magnetic storage media may correspond to a respective subset of tracks on a disk of magnetic storage media. The media health manager accesses read metrics of the zone of magnetic storage media and updates the read metrics of the zone based on the read metrics determined for the sector to provide updated read metrics for the zone of magnetic storage media. The media health manager then determines, with the neural network, a health score for the zone of magnetic storage media based on the updated read metrics of the zone of magnetic storage media.

The details of one or more implementations are set forth in the accompanying drawings and the following description. Other features and advantages will be apparent from the description and drawings, and from the claims.

BRIEF DESCRIPTION OF THE DRAWINGS

The details of one or more implementations of health management for magnetic storage media are set forth in the accompanying figures and the detailed description below. In the figures, the left-most digit of a reference number identifies the figure in which the reference number first appears. The use of the same reference numbers in different instances in the description and the figures indicates like elements.

DETAILED DESCRIPTION

Figure 1:
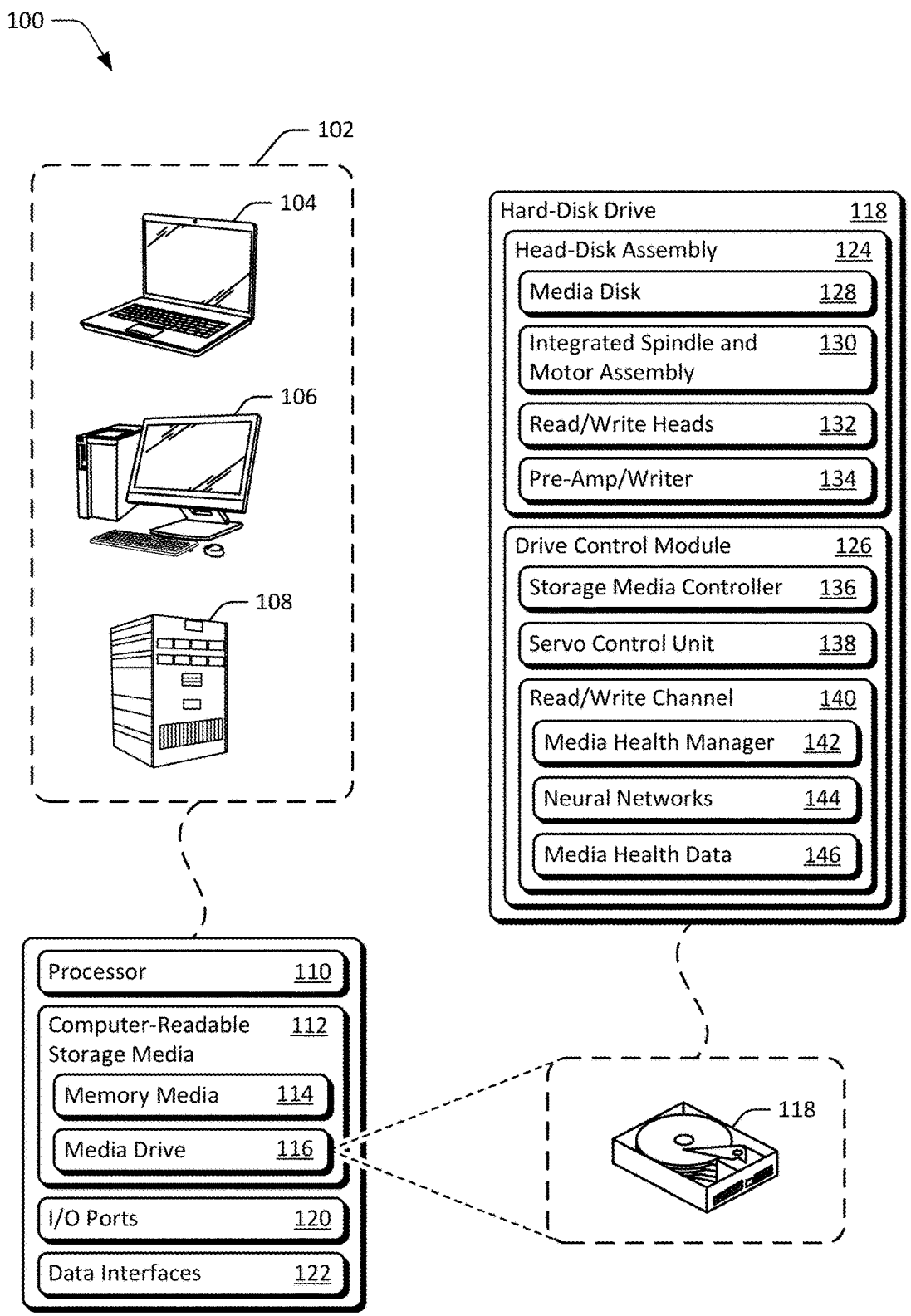
FIG. 1 illustrates an example operating environment having devices in which magnetic storage media is implemented in accordance with one or more aspects.

Conventional techniques for tracking hard-disk drive (HDD) wear or life expectancy often provide only a high-level view of actual drive usage, such as hours of operation or a number of sectors relocated within a drive. As noted, HDDs are a complex system of interlinked mechanical, electrical, and magnetic parts that operate in concert to facilitate the storage and access of data. With each generation of HDD release, this complexity and drive component tolerances become more critical as write density and storage capacity of the drives increase. Outside of catastrophic events, such as being dropped, these mechanical, electrical, and magnetic parts of the HDD wear gradually during the operating life of the HDD until a critical part failure occurs and the HDD dies. The loss of the HDD may be extremely expensive in terms of data loss, data recovery costs, service downtime (e.g., cloud resources), drive replacement costs, and so on. With the high-level view of drive usage provided by conventional techniques, users and other storage clients (e.g., data centers) are often unable to accurately estimate when the HDD will fail during its expected service life. As such, many HDDs fail unexpectedly before drive replacement or data backup are implemented, resulting in the loss of stored data or reduced availability of data storage services.

This disclosure describes apparatuses and techniques of health management for magnetic storage media. In contrast with conventional magnet writing techniques, the described apparatuses and techniques use metrics provided by a read channel that may more-accurately capture, directly or indirectly, gradual wear or degradation of components of a media drive. Generally, a read channel of a storage media drive processes and decodes signals when data is read from a storage media disk. The signal processing and decoding of the read signal by the read channel may include signal conditioning, sampling, equalization, detection, error-correction, or the like. As such, the read channel may determine or generate a wide variety of metrics (e.g., low-level analog and error-correction metrics) that reflect respective conditions of the electrical, mechanical, or magnetic components of the storage media drive.

Based on the metrics provided by the read channel, a media health manager may determine or update a health score for a portion or zone of magnetic storage media with a neural network. In some aspects, the neural network is pre-trained to classify a large volume of storage media metrics to a few or several health scores, which are useful to determine health of the magnetic storage media or health of a storage media drive. By so doing, internal operations of a storage media drive may be optimized to avoid areas of magnetic storage media with poor health or the storage media drive may be replaced based on this prediction of health. For example, most data centers or cloud service providers run millions of HDDs, which may be deployed across one or more locations. With the health scores provided by aspects of health management for magnetic storage media, data center administrators may efficiently implement HDD replacement or access redirection (e.g., to another HDD) before the HDD fails. This may enable the administrators to protect mission critical data and better ensure 24/7 availability of data server HDDs for compliance with various service level agreements (SLAs) for data access. In other cases, a media health manager may determine a probability of failure for one or more sectors of magnetic storage media. When a read of a sector is likely to fail, the media health manager may implement more aggressive error correction or notify a service provider (e.g., cloud) that the data will likely not be available, enabling the provider to obtain the desired data from another drive. In some cases, this may be effective to enable the service provider to meet the conditions of an SLA by providing the desired from an alternate location before waiting until an eventual read failure occurs with the low probability sector.

In various aspects of health management for magnetic storage media, a media health manager may determine, with a read channel, read metrics for a sector of the magnetic storage media that resides in a zone of magnetic storage media. The media health manager accesses read metrics of the zone and updates the read metrics of the zone based on the read metrics determined for the sector to provide updated read metrics for the zone of magnetic storage media. The media health manager then determines a health score for the zone of magnetic storage media with a neural network based on the updated read metrics of the zone of magnetic storage media. By so doing, gradual wear of the magnetic storage media may be predicted using the health score, enabling replacement of a magnetic storage media device before failure to improve reliability or availability of data stored to the magnetic storage media device.

The following discussion describes an operating environment, techniques that may be employed in the operating environment, and a System on Chip (SoC) in which components of the operating environment may be embodied. In the context of the present disclosure, reference is made to the operating environment by way of example only.

Operating Environment

FIG. 1 illustrates an example operating environment 100 having a computing device 102, capable of storing or accessing various forms of data or information. Examples of a computing device 102 may include a laptop computer 104, desktop computer 106, and server 108, any of which may be configured as part of a storage network or cloud storage. Further examples of a computing device 102 (not shown) may include a tablet computer, a set-top-box, a data storage appliance, wearable smart-device, television, content-streaming device, high-definition multimedia interface (HDMI) media stick, smart appliance, home automation controller, smart thermostat, Internet-of-Things (IoT) device, mobile-internet device (MID), a network-attached-storage (NAS) drive, aggregate storage system, gaming console, automotive entertainment device, automotive computing system, automotive control module (e.g., engine or power train control module), and so on.

Generally, the computing device 102 may provide, communicate, or store data for any suitable purpose, such as to enable functionalities of a particular type of device, provide a user interface, enable network access, implement gaming applications, playback media, provide navigation, edit content, provide data storage, or the like. Alternatively or additionally, the computing device 102 is capable of storing various data, such as databases, user data, multimedia, applications, operating systems, and the like. One or more computing devices 102 may be configured to provide remote data storage or services, such as cloud storage, archiving, backup, client services, records retention, and so on.

The computing device 102 includes a processor 110 and computer-readable storage media (CRM) 112. The processor 110 may be implemented as any suitable type or number of processors, either single-core or multi-core (e.g., ARM or x86 processor cores), for executing instructions or commands of an operating system or other programs of the computing device 102. The CRM 112 includes memory media 114 and a media drive 116. The memory media or system memory of the computing device 102 may include any suitable type or combination of volatile memory or nonvolatile memory. For example, volatile memory of the computing device 102 may include various types of random-access memory (RAM), dynamic RAM (DRAM), static RAM (SRAM) or the like. The non-volatile memory may include read-only memory (ROM), electronically erasable programmable ROM (EEPROM) or Flash memory (e.g., NOR Flash or NAND Flash). These memories, individually or in combination, may store data associated with applications and/or an operating system of computing device 102.

The media drive 116 of the computing device 102 may include one or more media drives or be implemented as part of a data storage system with which the computing device 102 is associated. In this example, the media drive 116 includes a hard-disk drive (HDD) 118, which is capable of storing data and is described with reference to various aspects of health management for magnetic storage media. Alternatively or additionally, the media drive 116 may be configured as any suitable type of data storage drive or system, such as a storage device, storage drive, storage array, storage volume, or the like. Although described with reference to the computing device 102, the media drive 116 may also be implemented separately as a standalone device or as part of a larger storage collective, such as a data center, server farm, or virtualized storage system (e.g., for cloud-based storage or services) in which aspects of health management for magnetic storage media are implemented.

The computing device 102 may also include I/O ports 120, a graphics processing unit (GPU, not shown), and data interfaces 122. Generally, the I/O ports 120 allow a computing device 102 to interact with other devices, peripherals, or users. For example, the I/O ports 120 may include or be coupled with a universal serial bus, human interface devices, audio inputs, audio outputs, or the like. The GPU processes and renders graphics-related data for computing device 102, such as user interface elements of an operating system, applications, or the like. In some cases, the GPU accesses a portion of local memory to render graphics or includes dedicated memory for rendering graphics (e.g., video RAM) of the computing device 102.

The data interfaces 122 of the computing device 102 provide connectivity to one or more networks and other devices connected to those networks. The data interfaces 122 may include wired interfaces, such as Ethernet or fiber optic interfaces for data communicated over a local network, intranet, or the Internet. Alternatively or additionally, the data interfaces 122 may include wireless interfaces that facilitate communication over wireless networks, such as wireless local-area-networks (WLANs), wide-area wireless networks (WANs, e.g., cellular networks), and/or wireless personal-area-networks (WPANs). Any of the data communicated through the I/O ports 120 or the data interfaces 122 may be written to or read from the storage system of the computing device 102 in accordance with one or more aspects of health management for magnetic storage media.

Returning to the media drive 116, the computing device 102 may include the hard-disk drive 118 as shown and/or other types of storage media for which aspects of health management may be implemented. Although not shown, other configurations of the media drive 116 are also contemplated, such as a solid-state drive (SSD), a magnetic tape drive, optical media drives, HDD/SSD hybrid drives, and other storage systems that write data to storage media (e.g., magnetic or optical storage media). Alternatively or additionally, the computing device 102 may include an array of media drives or serve as a media drive aggregation device or host for multiple media drives in which aspects of health management may be implemented.

In this example, the disk drive 118 includes a head-disk assembly (HDA) 124 and drive control module 126 to implement or enable functionalities of the hard-disk drive 118. In some cases, the drive control module 126 is implemented as a printed circuit board assembly (PCBA) with semiconductor devices, logic, or other circuitry. The HDA 124 includes one or more media disks 128 (or platters) mounted on an integrated spindle and motor (e.g., voice coil motor (VCM)) assembly 130. The spindle and motor assembly 130 may rotate the media disk 128 under (or over) read/write heads 132 coupled with a head assembly (not shown) of the HDA 124. The media disks 128 may be coated with a magnetically hard material (e.g., a particulate surface or a thin-film surface) and may be written to, or read from, a single side or both sides. The read/write heads 132 may be operably coupled with a pre-amplifier/writer module 134 (pre-amp/writer 134) of the HDA 124 that includes pre-amplifier circuitry and other logic for amplifying write signals or read signals, respectively. The pre-amp/writer 134 may receive or store head selection, amplification, or sense current values useful for writing data to, or reading data from, the magnetic media 202.

As shown in FIG. 1, the example drive control module 126 of the hard-disk drive 118 may include a storage media controller 136, a servo control unit 138, and a read/write channel 140 (read channel 140). The storage media controller 136 enables the computing device 102 to access contents of magnetic storage media of the media drive 116, such as an operating system, applications, or data for applications or other services. The storage media controller may also write and read data of the computing device 102 to and from the magnetic storage media of the media drive. Generally, the drive control module 126 may direct or use the servo control unit 138 to control mechanical operations, such as read/write head 132 positioning through the HDA 124 and rotational speed control through the spindle and motor assembly 130.

The read/write channel 140 may include digital-to-analog and analog-to-digital paths for converting write data to a write signals or converting read signals to read data, respectively. For example, the read channel 140 may process and decode signals when data is read from the media disk 128. This signal processing and decoding of the read signal may include signal conditioning, sampling, equalization, detection, error-correction, or the like. How the read channel 140 is implemented and used varies and is described throughout this disclosure. The drive control module 126 or components thereof may be implemented as one or more IC chips, a System-on-Chip, a System-in-Package, or a microprocessor provided with or implementing a hard-disk-drive controller. The drive control module 126 may also include drive electronics (not shown) and/or include various interfaces, such as a host-bus interface, storage media interface, spindle interface, or a pre-amp/writer interface.

In some aspects, the read channel 140 includes or is associated with a media health manager 142, neural networks 144, and media health data 146. The media health manager 142 may obtain metrics from the read channel 140 for a sector of magnetic storage media from which data is read. Based on the metrics provided by the read channel 140, the media health manager 142 may determine or update a health score for a portion or zone of magnetic storage media, such as by using the neural networks 144. One or more of these neural networks 144 may be pre-trained to classify a large volume of storage media metrics to a few or several health scores, which are useful to determine health of the magnetic storage media or health of a storage media drive. The media health data 146 may include previously computed health scores for zones or portions of the magnetic storage media, as well as averages of read channel metrics for sectors or tracks of the magnetic storage media. In some cases, the media health manager 142 stores the determined health scores for the portions or zones of the magnetic storage media to the media health data 146, which may be part of an information table for the zones or the portions of magnetic storage media. How the media health manager 142, neural networks 144, or media health data 146 are implemented and used varies and is described throughout this disclosure.

Figure 2:
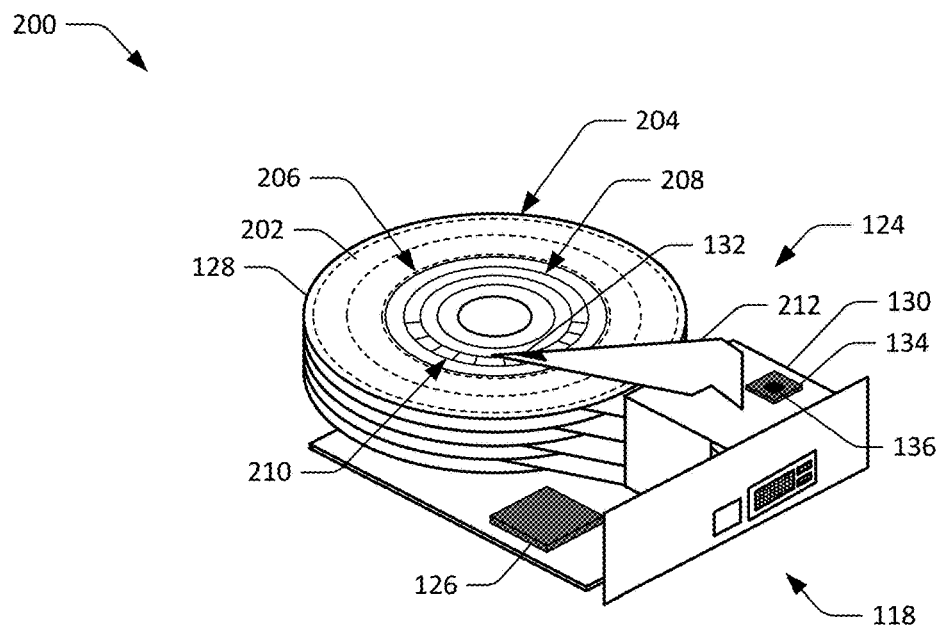
FIG. 2 illustrates an example configuration of the hard-disk drive shown in FIG. 1.
Figure 2:
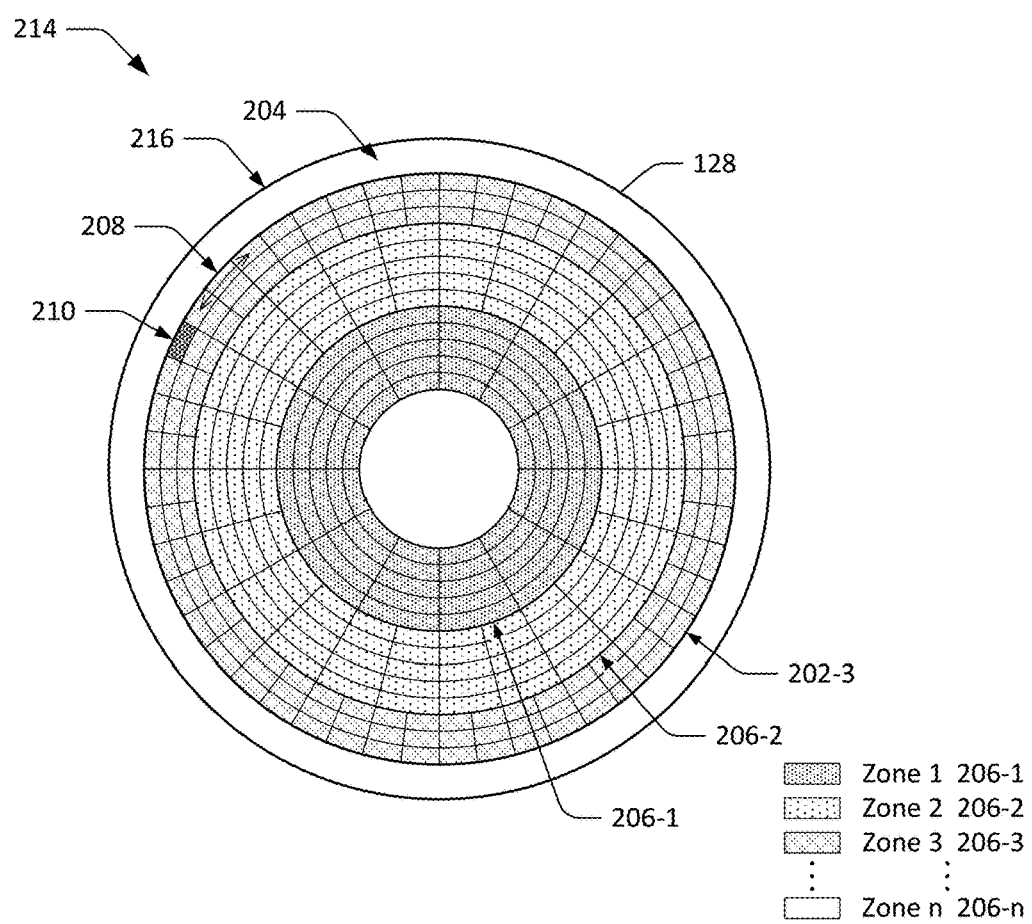

By way of example, consider FIG. 2 which provides an example configuration of the hard-disk drive 118, illustrated generally at 200 (shown without a protective enclosure). As shown in FIG. 2, the HDA 124 of the hard-disk drive 118 includes an integrated spindle and motor assembly 130 by which media disks 128 (or platters) of magnetic storage media 202 are supported and/or operated. Generally, each of the media disks 128 may be portioned or divided into predefined zones or regions of the magnetic storage media 202. In this example, a surface 204 of the media disk 128 is divided into or includes three zones 206 (e.g., circular belts/rings or wedges) that include a respective subset of tracks 208 and sectors 210 of the magnetic storage media 202. Others of the media disks 128 or surfaces of those disks may be configured similarly to or differently (e.g., different number of zones) from those illustrated in FIG. 2. In some aspects, the media health manager maintains a state of drive health in the form of zone health score cards for one or more of the zones 206 of the magnetic storage media.

During operation, an arm 212 may maneuver, and thus position a read/write head 132 (or multiple read/write heads 132) over a desired track 208 or sector 210 of the magnetic storage media 202 on the media disk 128. In various aspects, the read/write head 132 may include various numbers of head elements with combined or separate functions (e.g., dedicated R/W functions). For example, the read/write head 132 may include one or more readers (read heads/elements) and one writer (write head/element). In other cases, the read/write head 132 may include a dedicated write head (element) and one or more separate, additional dedicated read heads (elements). Alternatively or additionally, although multiple arms 212 are shown in FIG. 2, the HDA 124 or spindle and motor assembly may be implemented with a single arm 212 or other suitable structures for positioning the read/write head 132.

The HDA 124 and the drive control module 126 may be implemented separately, on separate substrates, and/or as separate PCBAs of a media drive. Signals or data communicated between the HDA 124 and the drive control module 126 may be carried through a flexible printed cable or other suitable connective structures, such as traces, connectors, bond wires, solder balls, or the like. The HDA 124 of the hard-disk drive 118 may be configured to perform write operations in accordance with any suitable recording technology, such as perpendicular magnetic recording (PMR), shingled magnetic recording (SMR), heat-assisted magnetic recording (HAMR), microwave assisted magnetic recording (MAMR), or the like.

FIG. 2 also illustrates at 214 a plan view of a media disk 128 with zones 206 of magnetic storage media 202 that are implemented in accordance with one or more aspects. In this example, tracks 208 and sectors 210 of a surface 204 of a platter 216 are organized or divided into three zones of magnetic storage media that include zone 1 206-1, zone 2 206-2, and zone 3 206-3. Although illustrated with three zones 206, a platter 216 or surface 204 of a media disk 128 may be organized into or include any suitable number of zones 206, such as zone 1 206-1 to zone n 206-*n*, where n is any suitable number. Generally, each zone 206 may be configured to include a subset of tracks 208 and sectors 210 of magnetic storage media 202 of a surface 204. In some cases, the zones 206 are configured such that each zone includes an approximately equal number of sectors 210 or surface area of the platter 216.

In various aspects of health management of magnetic storage media, the media health manager 142 may maintain health scores for the zones 206 of the media disk 128. Generally, a zone health score may be updated based on metrics provided by the read channel 140 when a sector 210 of that zone 206 is accessed to read data from the sector 210 of magnetic storage media. The health score for the zone of magnetic storage media may indicate of a level of wear, a level of degradation, or a level of reliability of the zone of magnetic storage media. Alternatively or additionally, these zone health scores may also be compiled for multiple media disks 128 of a hard-disk drive 118 to enable determination of a drive health score for the hard-disk drive 118.

Figure 3:
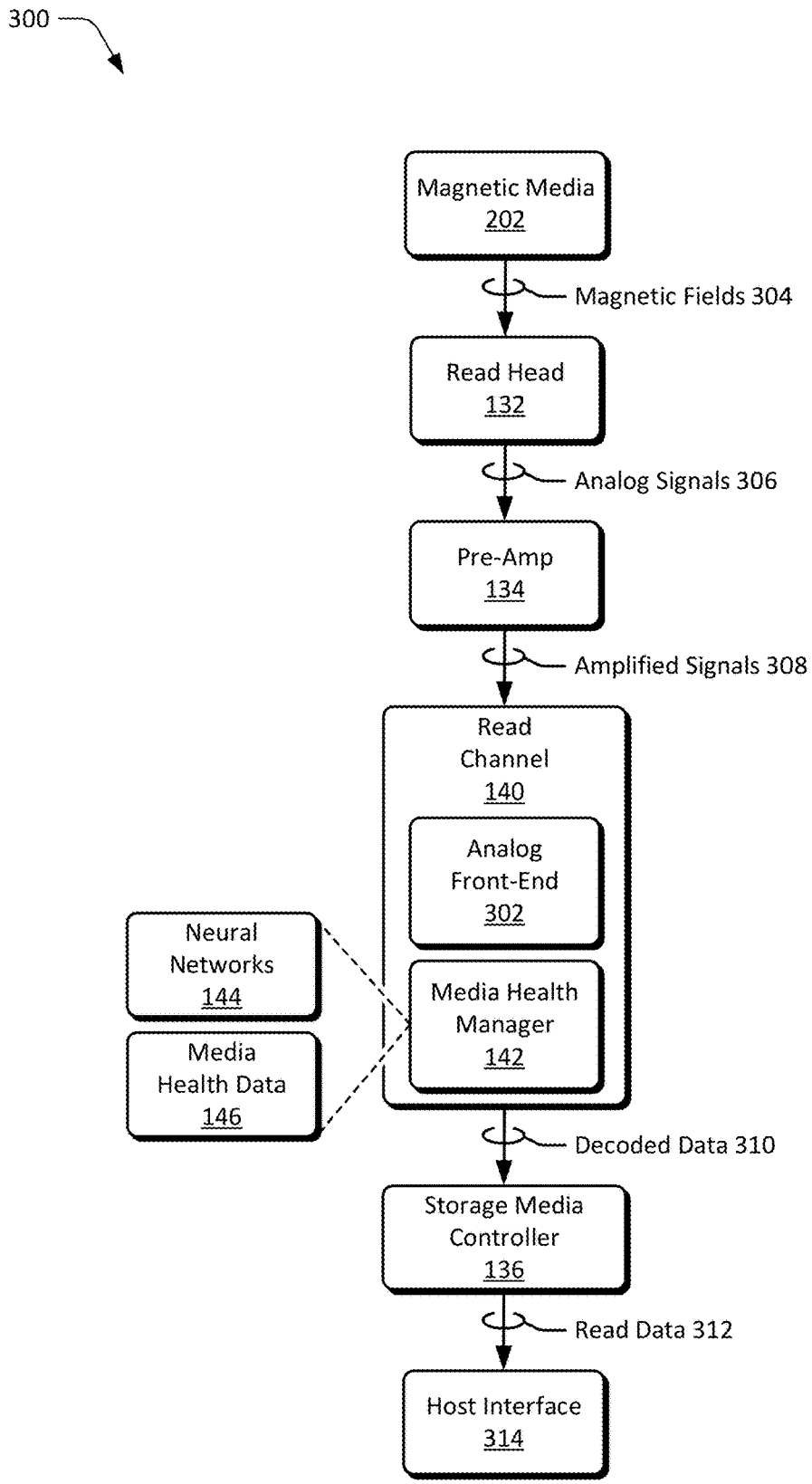
FIG. 3 illustrates example configurations of a read channel and pre-amplifier in accordance with one or more aspects of health management for magnetic storage media.

FIG. 3 illustrates example configurations of a read channel and pre-amplifier generally at 300, which are implemented in accordance with one or more aspects of health management for magnetic storage media. In this example, the media health manager 142 and an analog front-end 302 are operably coupled with the read channel 140. Additionally, the neural networks 144 and media health data 146 operably coupled with or accessible by the media health manager 142 of the read channel 140. Although shown in FIG. 3 as separate components or circuitry, the read channel 140 and media health manager 142 may be integrated as one component, separated among other components of the hard-disk drive 118, and/or integrated with other microelectronics or circuitry of the pre-amp 134 and/or the read channel 140.

In this example, the read channel 140 and other components are described in the context of reading data from sectors of the magnetic storage media 202 (magnetic media 202). For example, a host system or computing device 102 may issue a read command for data stored to one or more sectors 210 of the media disk 128. As the media disk 128 rotates under the read head 132, the read head 132 senses magnetic fields 304 of data stored to the magnetic media 202, which induce analog signals 306 at the read head 132. The pre-amplifier 134 (pre-amp 134) amplifies the analog signals 306 received from the read head 132 and provides amplified signals 308 to the analog front-end 302 of the read channel 140.

Generally, the analog front-end 302 conditions and samples the amplified signals 308 (e.g., a read-back continuous time signal) provided by the pre-amp 134. The read channel 140 converts the sampled signals into digital signal and recovers decoded data 310, which is provided to the storage media controller 136. The read channel 140 may include any suitable combination of an equalizer module, a detector module, an adaptation module, or a gain module for detection, equalization, and/or decoding of data 310 from signals received from the pre-amp 134. Concluding the present example, the storage controller 136 may then send the decoded data 310 to a host interface 314 as read data 312 to fulfill the read command issued by the host system or computing device 102.

In relation to various data access operations, such as read operations for data stored to one or more sectors 210 of the media disk 128, the media health manager 142 may implement aspects of health management for magnetic storage media. Generally, a table of zone information and/or the media health data may include calibrated parameters associated with or useful to access a particular zone of magnetic storage media. The media health manager 142 or read channel 140 may maintain a state of magnetic storage media health in the form of zone health scores or score cards, such as by grading health of a zone on a scale of 1 (e.g., poor) to 5 (e.g., excellent). The health score for a zone may be updated or recalculated any time a sector is read from that particular zone. In some aspects, the media health manager generates or updates the health score by obtaining various internal metrics from the read channel for a given sector of the zone (e.g., during a read operation) and uses a machine learning algorithm or neural network to determine the health score based on the internal metrics. These internal metrics may include unrecovered sectors, retry method count, average errors corrected by error-correcting code, log likelihood ratio (LLR) probability density function (PDF) statistics, sync mark errors, various loop errors, or the like.

For example, when the media disk 128 seeks to a particular zone 206 to read one or more sectors 210, the media health manager 142 may read previously computed zone metrics from the media health data 146, which may be implemented as part of a table of zone information (not shown). Based on current metrics for the sectors 210 of the zone 206 being read, the media health manager updates both long-term and short-term averages of the metrics for these sectors 210. The media health manager may then determine, with a neural network, a health score for the zone 206 based on the updated long-term and short-term metrics. The neural network may be pre-trained to map a wide variety of read channel metrics to a few or several health condition state. The updated health score for the zone 206 and updated metrics may also be written back to the media health data 146 or table of zone information on exit from a given zone.

Various aspects of health management for magnetic storage media described throughout the disclosure may be implemented by a media health manager 142 that interacts with the neural networks 144 (e.g., FIGS. 4 and 5) or any suitable artificial intelligence (AI) engine, AI models, or AI driver of or associated with a storage system controller or read channel With respect to processing various metrics of a storage media drive or system (e.g., read metrics, signal metrics, or electro-mechanical metrics), one or more of the neural networks 144 may be implemented with machine-learning that is based on one or more neural networks (e.g., pre-trained) for media health scoring, component wear estimation, or predicting drive health. Any AI model, AI algorithm, or neural network of the media health manager 142 may include a group of connected nodes, such as neurons or perceptrons, which are organized into one or more layers.

An instance of a neural network 144 associated with the media health manager 142 may be implemented with a deep neural network that includes an input layer, an output layer, and one or more hidden intermediate layers positioned between the input layer and the output layers of the neural network. Each node of the deep neural network may in turn be fully connected or partially connected between the layers of the neural network. A neural network 144 may be any deep neural network (DNN), such as a convolutional neural network (CNN) including one of AlexNet, ResNet, GoogleNet, MobileNet, or the like. Alternatively or additionally, a neural network 144 may include any suitable recurrent neural network (RNN) or any variation thereof. Generally, an AI model or neural network employed by the media health manager 142 may also include any other supervised learning, unsupervised learning, reinforcement learning algorithm, or the like.

In various aspects, a neural network 144 may be implemented as a recurrent neural network with connections between nodes forming a cycle to retain information from a previous portion of an input data sequence for a subsequent portion of the input data sequence (e.g., internal metrics of a read channel). Alternately, a neural network 144 may be implemented as a feed-forward neural network having connections between the nodes that do not form a cycle between input data sequences. In yet other cases, a neural network 144 of the media health manager 142 may include a convolutional neural network (CNN) with multilayer perceptrons where each neuron in a given layer is connected with all neurons of an adjacent layer. In some aspects, a neural network 144 is based on a convolutional neural network that may be applied to previous media health scoring to predict or forecast some form of subsequent or future health trend of the magnetic storage media. Alternately or additionally, the neural network 144 may include or utilize various regression models, such as multiple linear regression models, a single linear regression model, logistical regression models, stepwise regression models, multi-variate adaptive regression models, locally estimated scatterplot models, or the like.

Figure 4:
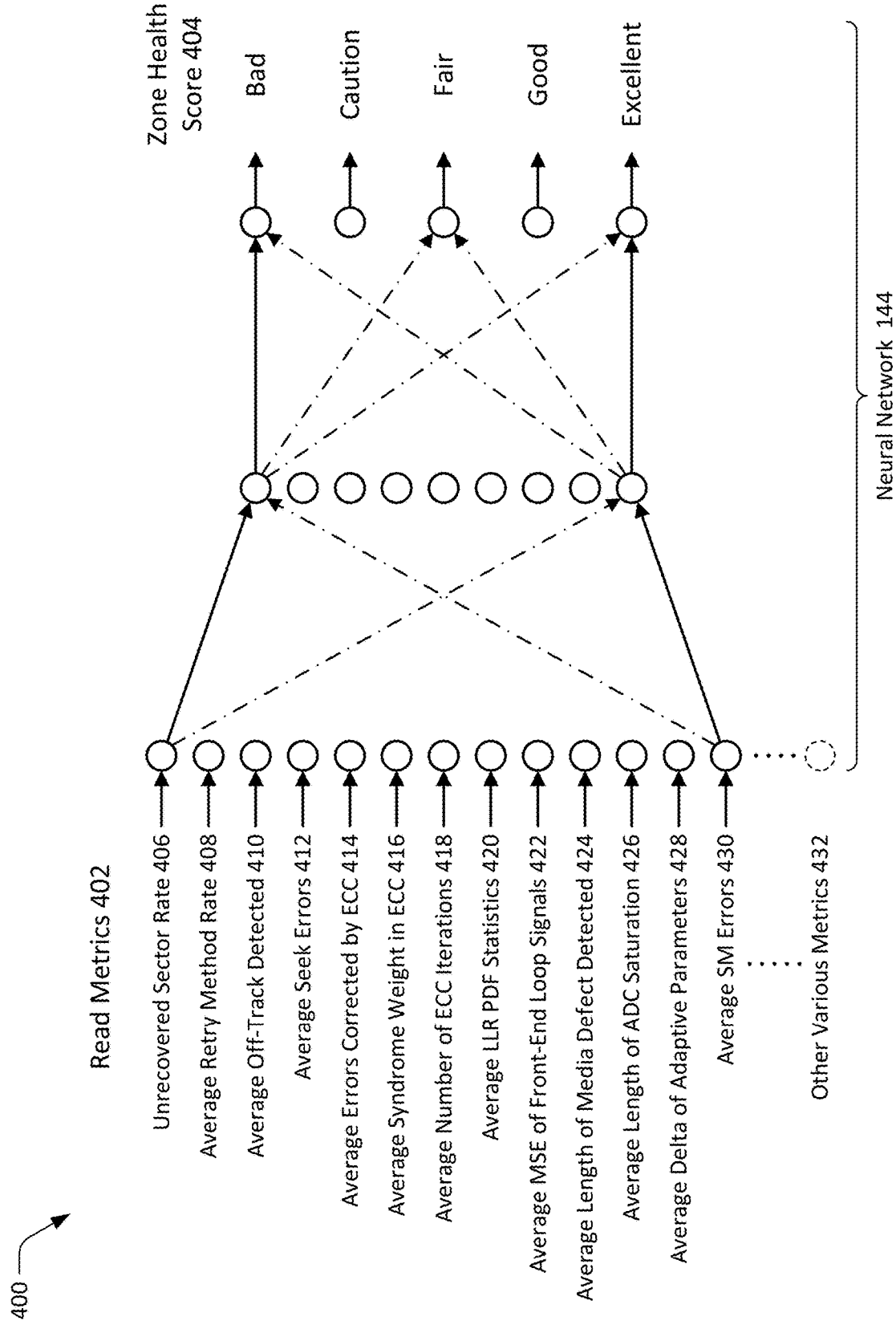
FIG. 4 illustrates an example configuration of a neural network that may be implemented to compute health scores for a zone of magnetic storage media.

By way of example, consider FIG. 4 in which an example configuration of a neural network is illustrated generally at 400. This example neural network 144 is implemented in accordance with one or more aspects to compute health scores for a zone of magnetic storage media. Generally, the neural network 144 is configured to map or classify internal metrics 402 of the read channel 140 (read metrics 402) to zone health scores 404 for the zones of magnetic storage media.

As shown in FIG. 4, the inputs of the neural network 144 may include any suitable number of the internal metrics 402 of the read channel 140. In some aspects, the neural network 144 is pre-trained to map the read metrics 402 to one of five zone health scores 404 that range from bad, caution, fair, good, and excellent. The read channel 140 may generate or have access to a wide variety of internal metrics, which may be useful in computing or determining a health score for a zone of magnetic storage media. In this example, the read metrics include an unrecovered sector rate 406, an average retry method rate 408, an average of off-track detections 410, an average number of seek errors 412, an average number of errors corrected by error-correcting code (ECC) 414, an average syndrome weight in ECC 416, an average number of ECC iterations 418, an average of log likelihood ratio (LLR) probability density function (PDF) statistics 420, an average mean square error (MSE) of front-end loop signals 422, an average length of detected media defects 424, an average length of analog-to-digital converter (ADC) saturation 426, an average delta of an adaptive parameter 428, an average of sync mark (SM) errors 430, or other various metrics 432. As such, based on the detailed internal metrics available to the media health manager 142, the neural network 144 may determine zone health scores that predict storage media drive wear or reliability with much more accuracy than conventional techniques for tracking drive life by hours or sector re-mappings.

Figure 5:
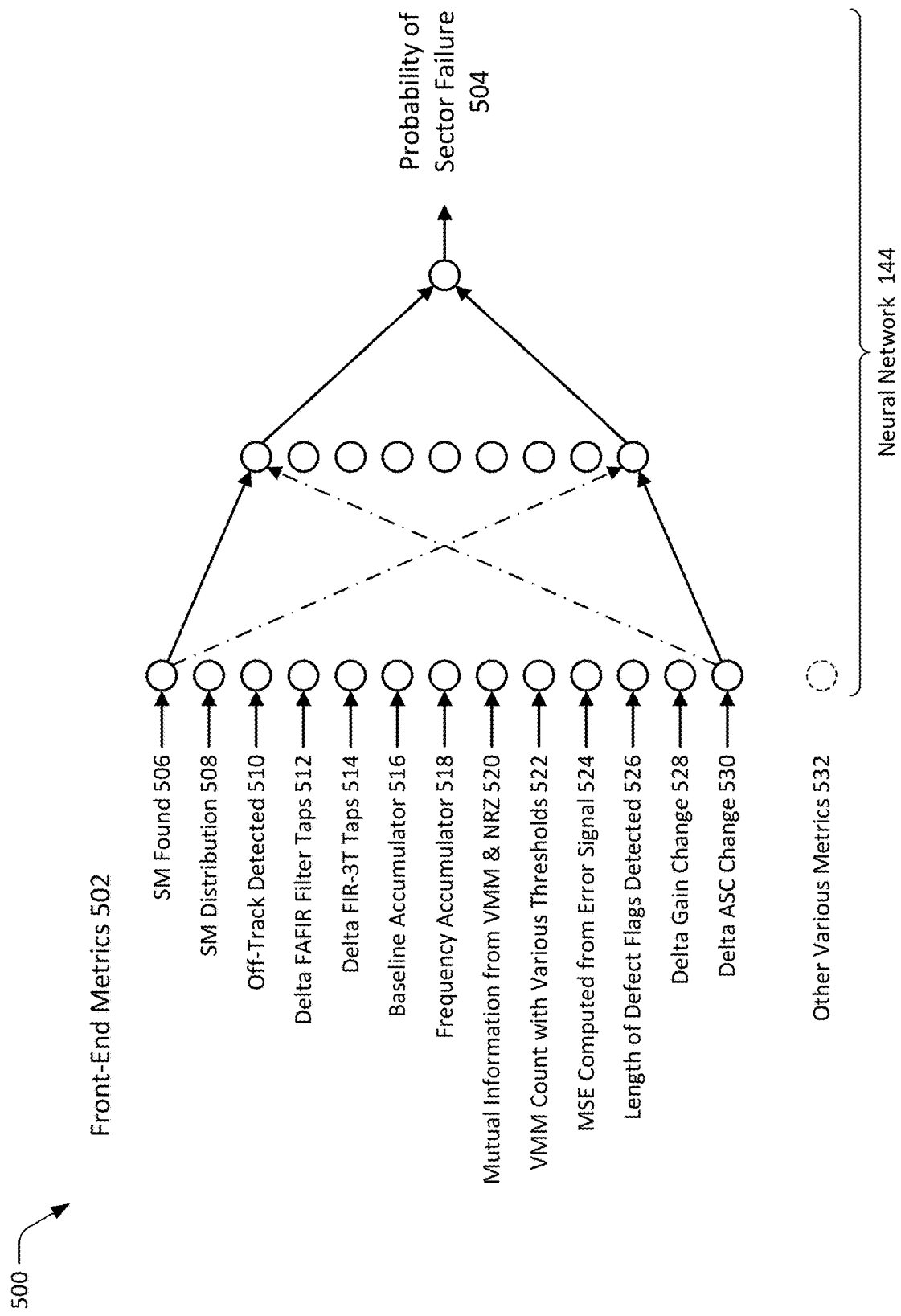
FIG. 5 illustrates an example configuration of a neural network that may be implemented to compute a probability of failure for a sector of magnetic storage media.

FIG. 5 illustrates at 500 an example configuration of a neural network implemented in accordance with one or more aspects to compute a probability of failure for a sector of magnetic storage media. In some aspects, a probability of sector failure may be useful to optimize queue management for data or select a particular pipeline for decoding data of a sector. For example, a front-end section of the read channel may classify each sector into one of three or five levels of signal-to-noise ratio, this classification may be used by a back-end section of the read channel to select a pipeline for decoding each sector to improve decoding efficiency. In this example, the neural network 144 is configured to determine for a sector, based on front-end metrics 502, a probability of sector failure 504. Using this probability of sector failure 504, a back-end of the read channel 140 may select a pipeline for decoding the sector that is more likely to succeed than a default progression through multiple pipelines as initial attempts of decoding the sector fail. Alternatively or additionally, the media health manager may notify a service provider (e.g., cloud) that the data will likely not be available from the low probability sector, enabling the provider to obtain the desired data from another drive instead of waiting until the read operation eventually fails.

As shown in FIG. 5, the front-end of the read channel 140 may generate or have access to a wide variety of internal metrics, which may be useful in computing or determining a probability of sector failure. In this example, the front-end metrics include an indication of sync mark found 506, sync mark distribution 508, off-track detected 510, delta feed ahead finite impulse response (FAFIR) filter taps 512, delta FIR-3T taps 514, baseline accumulator 516, frequency accumulator 518, mutual information from Vmm and non-return to zero (NRZ) 520, Vmm count with various thresholds 522, MSE computed from error signal 524, length of defect flags detected 526, delta gain change 528, delta ASC change 530, or other various metrics 532. As such, based on the detailed internal metrics available to the read channel 140, the neural network 144 may predict a probability of sector failure 504 that is useful to alter or optimize pipeline selection to improve decoding of less-than-optimal sectors.

Techniques of Health Management for Magnetic Storage Media

The following discussion describes techniques of health management for magnetic storage media, which may enable improved data reliability or availability (e.g., uptime) by predicting or tracking health (e.g., wear) of magnetic storage media components. These techniques may be implemented using any of the environments and entities described herein, such as the read channel 140, media health manager 142, neural networks 144, or media health data 146. These techniques include methods 600 through 900 illustrated in FIGS. 6-9, each of which is shown as a set of operations performed by one or more entities.

These methods are not necessarily limited to the orders of operations shown in the associated figures. Rather, any of the operations may be repeated, skipped, substituted, or re-ordered to implement various aspects described herein. Further, these methods may be used in conjunction with one another, in whole or in part, whether performed by the same entity, separate entities, or any combination thereof. For example, aspects of the methods described may be combined to implement health scores of various granularities for magnetic storage media, such as respective health scores for zones, surfaces, disks, or drives of magnetic storage media. In portions of the following discussion, reference will be made to the operating environment 100 of FIG. 1 and entities of FIGS. 2-5. Such reference is not to be taken as limiting described aspects to the operating environment 100, entities, configurations, or implementations, but rather as illustrative of one of a variety of examples. Alternatively or additionally, operations of the methods may also be implemented by or with entities described with reference to the System-on-Chip of FIG. 10 and/or the storage media controller of FIG. 11.

Figure 6:
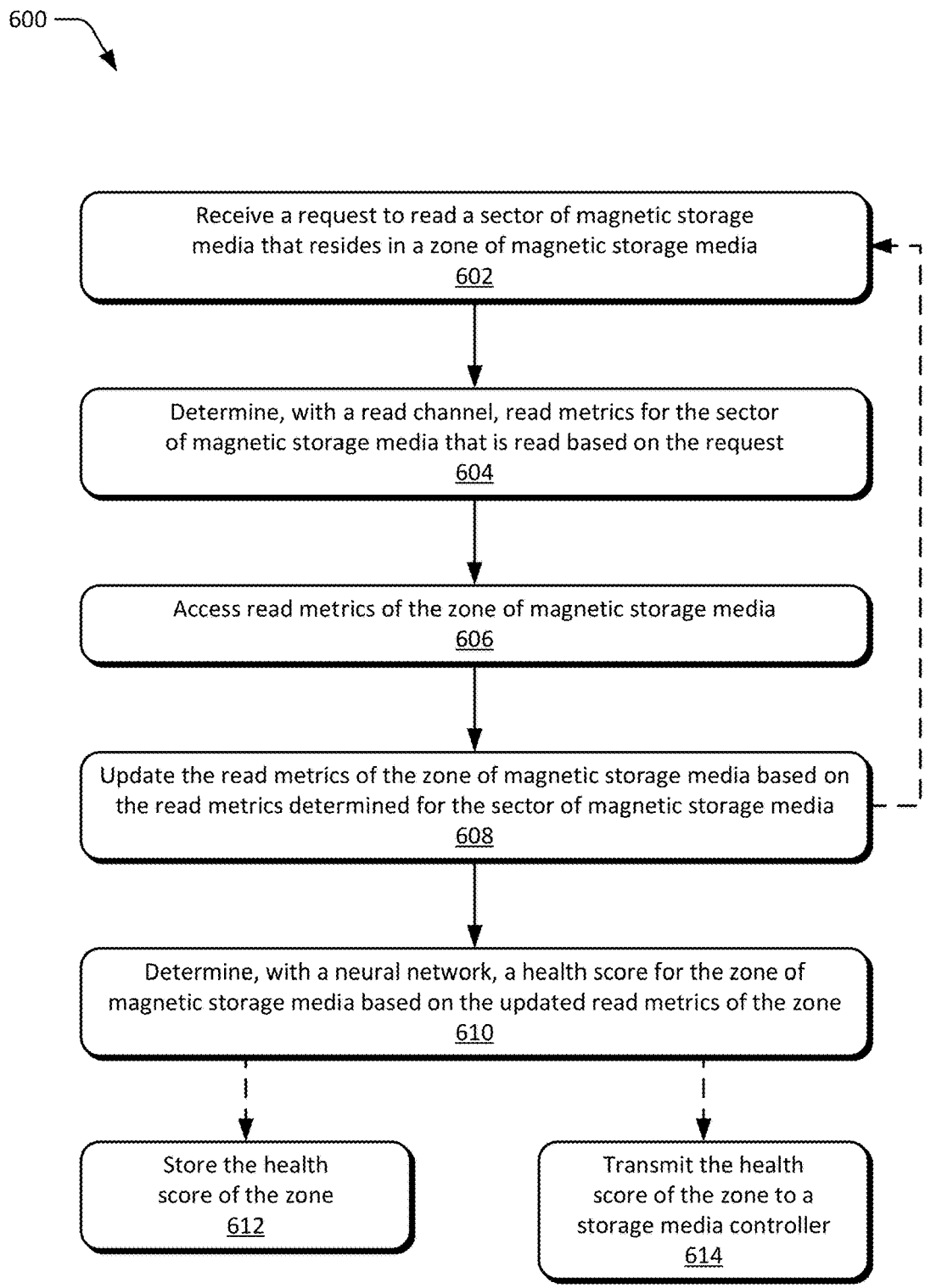
FIG. 6 depicts an example method for determining a health score for a zone of magnetic storage media.

FIG. 6 depicts an example method 600 for determining a health score for a zone of magnetic storage media, including operations performed by or with the read channel 140, media health manager 142, neural networks 144, and/or media health data 146.

At 602, a request to read a sector of magnetic storage media is received. The sector of magnetic storage media may reside in a zone of magnetic storage media. In some cases, a read channel receives the request to read the sector (or data from the sector) from a storage media controller. The request may be one of multiple requests that result in multiple respective sectors being read from a particular sector of a media disk or platter of magnetic storage media. Alternatively or additionally, the media health manager may determine, from multiple zones of magnetic storage media, a zone of magnetic storage media in which the sector resides.

At 604, read metrics are determined for the sector with a read channel. The read metrics are determined for the sector that is read based on the request. In some cases, the read metrics include internal metrics of the read channel, such as an unrecovered sector rate, an average retry method rate, an average number of off-track detections, an average number of seek errors, an average number of errors corrected by error-correcting code (ECC), an average syndrome weight in ECC, an average number of ECC iterations, an average of log likelihood ratio (LLR) probability density function (PDF) statistics, an average mean square error (MSE) of front-end loop signals, an average length of detected media defects, an average length of analog-to-digital converter (ADC) saturation, an average delta of an adaptive parameter, or an average of sync mark errors.

At 606, read metrics of the zone of magnetic storage media are accessed. These read metrics may include previously determined or computed read metrics for sectors of the zone. In some cases, a table of zone information or repository of media health data is accessed to obtain the read metrics of the zone. Generally, the read metrics of the zone may include respective read metrics for the sector being read, as well as other sectors that reside in the zone of magnetic storage media. Alternatively or additionally, read metrics for a sector may include a long-term average of a particular read metric and a short-term average of the particular read metric.

At 608, the read metrics of the zone of magnetic storage media are updated based on the read metrics determined for the sector of magnetic storage media. Read metrics for each sector read from the zone may be updated based on current respective read metrics provided by the read channel for that sector. In some cases, the updating may include updating both long-term and short-term averages of a metric of the sector.

At 610, a health score is determined for the zone of magnetic storage media with a neural network. The neural network determines the health score based on the updated read metrics of the zone of magnetic storage media. The neural network may be configured or pre-trained to map the updated read metrics of the read channel to one of at least three health score classifications to determine the health score for the zone of magnetic storage media. The health score for the zone of magnetic storage media may indicate of a level of wear, a level of degradation, or a level of reliability of the zone of magnetic storage media.

Optionally at 612, the health score of the zone of magnetic storage media is stored. The health score for the zone of magnetic storage media may be written to a table of zone information or repository of media health data. Alternatively or additionally, the updated read metrics for the sectors of the zone may also be written back to the table of zone information or repository of media health data.

Optionally at 614, the health score of the zone of magnetic storage media is transmitted to a storage media controller. In some cases, sending the health score of the zone of the magnetic storage media to the storage media controller enables the storage media controller to compile the health score with other metrics to determine a health score for a media drive or higher-level storage entity with which the storage media controller is associated.

Figure 7:
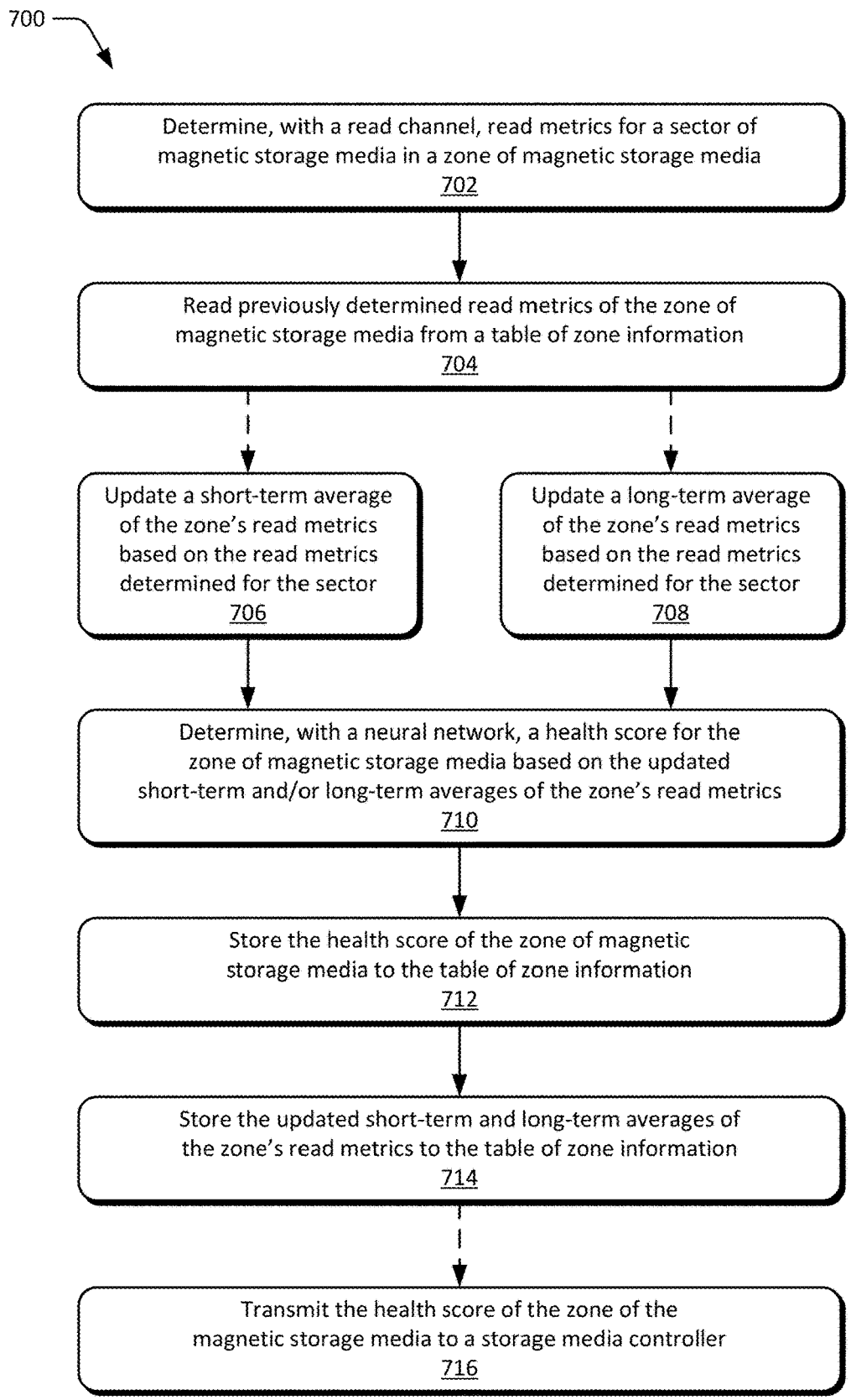
FIG. 7 depicts an example method for determining a health score for a zone based on an average of read metrics provided by a read channel.

FIG. 7 depicts an example method 700 for determining a health score for a zone based on an average of read metrics provided by a read channel, including operations performed by or with the read channel 140, media health manager 142, neural networks 144, and/or media health data 146.

At 702, read metrics for a sector of magnetic storage media are determined with a read channel. The sector of magnetic storage media may reside or be in a zone of magnetic storage media. In some cases, respective read metrics are determined for multiple sectors that are being read from the zone of magnetic storage media. Alternatively or additionally, the media health manager may determine, from multiple zones of magnetic storage media, a zone of magnetic storage media in which the sector resides.

At 704, previously determined read metrics of the zone are read from a table of zone information. Generally, the previously determined read metrics of the zone may include respective read metrics for the sector being read, as well as other sectors that reside in the zone of magnetic storage media. Alternatively or additionally, read metrics for a sector may include a long-term average of a particular read metric and a short-term average of the particular read metric.

Optionally at 706, a short-term average of the zone's read metrics is updated based on the read metrics determined for the sector. Generally, the short-term average of a read metric for the sector is updated based on the current read metric provided by the read channel In cases of multiple sectors read from the zone, respective short-term averages of read metrics may be updated for each of the multiple sectors read from the zone.

Optionally at 708, a long-term average of the zone's read metrics is updated based on the read metrics determined for the sector. Generally, the long-term average of a read metric for the sector is updated based on the current read metric provided by the read channel In cases of multiple sectors read from the zone, respective long-term averages of read metrics may be updated for each of the multiple sectors read from the zone.

At 710, a health score is determined for the zone of magnetic storage media with a neural network. The neural network determines the health score based on the updated short-term and/or long-term averages of the zone's read metrics. The neural network may be configured or pre-trained to map the updated short-term and/or long-term averages of the zone's read metrics to one of at least three health score classifications to determine the health score for the zone of magnetic storage media. The health score for the zone of magnetic storage media may indicate of a level of wear, a level of degradation, or a level of reliability of the zone of magnetic storage media.

At 712, the health score of the zone of magnetic storage media is stored to the table of zone information. Alternatively or additionally, the health score for the zone of magnetic storage media may be written to a repository of media health data. At 714, the updated short-term and long-term averages of the zone's read metrics are stored to the table of zone information. In some cases, the updated short-term and long-term averages of the zone's read metrics may be written to a repository of media health data.

Optionally at 716, the health score of the zone of magnetic storage media is transmitted to a storage media controller. In some cases, sending the health score of the zone of the magnetic storage media to the storage media controller enables the storage media controller to compile the health score with other metrics (e.g., electro-mechanical or signal metrics) and use the combined metrics to determine a health score for a media drive or higher-level storage entity with which the storage media controller is associated.

Figure 8:
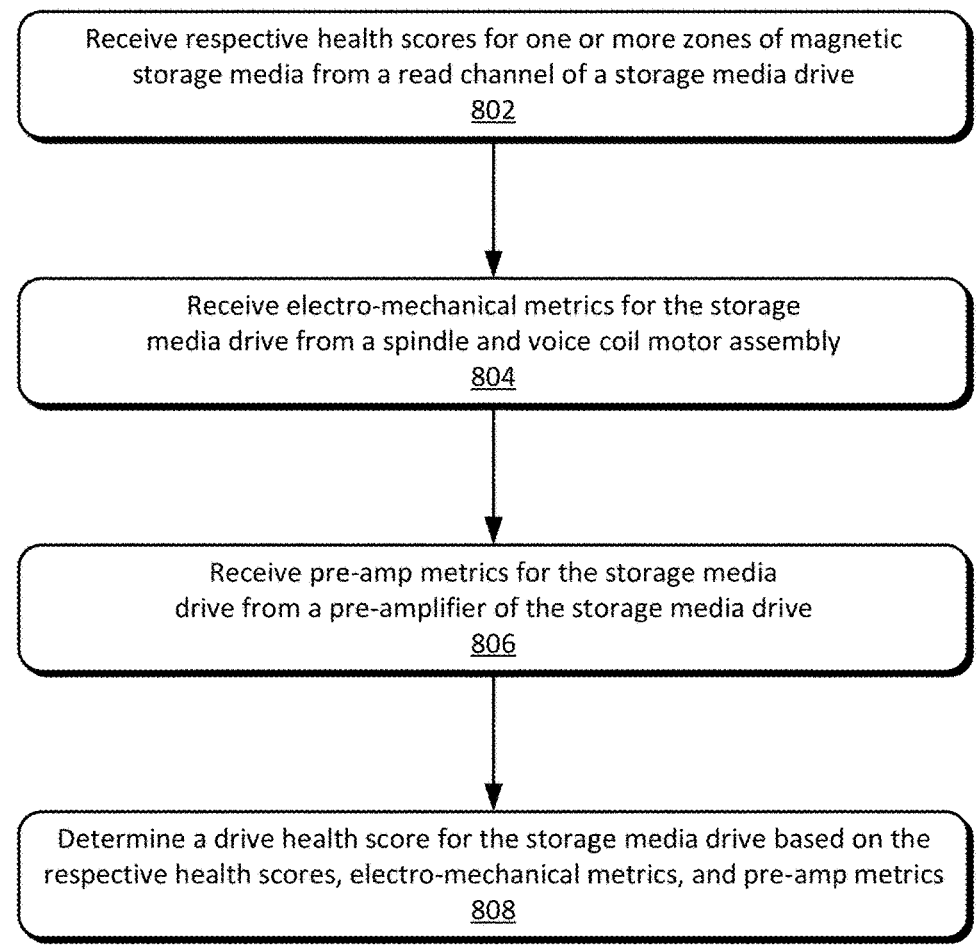
FIG. 8 depicts an example method for determining a storage media drive health score in accordance with one or more aspects.

FIG. 8 depicts an example method 800 for determining a storage media drive health score in accordance with one or more aspects, including operations performed by or with the read channel 140, media health manager 142, neural networks 144, and/or media health data 146.

At 802, respective health scores for one or more zones of magnetic storage media are received from a read channel of a storage media drive. The respective health scores may be received from a media health manager or read channel associated with a platter or surface of a media disk on which the zones are embodied or organized.

At 804, electro-mechanical metrics for the storage media drive are received from a spindle and voice coil motor assembly of the storage media drive. The electro-mechanical metrics may include any suitable metrics related to parameters, calibration information, or performance data associated with the spindle, voice coil motor, or other electro-mechanical components of the storage media drive.

At 806, signal metrics for the storage media drive are received from a pre-amplifier of the storage media drive. The signal metrics may include various amplification or gain settings of the pre-amplifier. In some cases, the signal metrics include respective signal metrics for multiple platters or surfaces of magnetic storage media of the storage media drive.

At 808, a drive health score is determined for the storage media drive based on the respective health scores of the zones, the electro-mechanical metrics, and the signal metrics. In some cases, at least two of the health scores, electro-mechanical metrics, or signal metrics are used to determine an overall or final health score for the storage media drive. The health score for the storage media drive may indicate of a level of wear, a level of degradation, or a level of reliability of the storage media drive.

Figure 9:
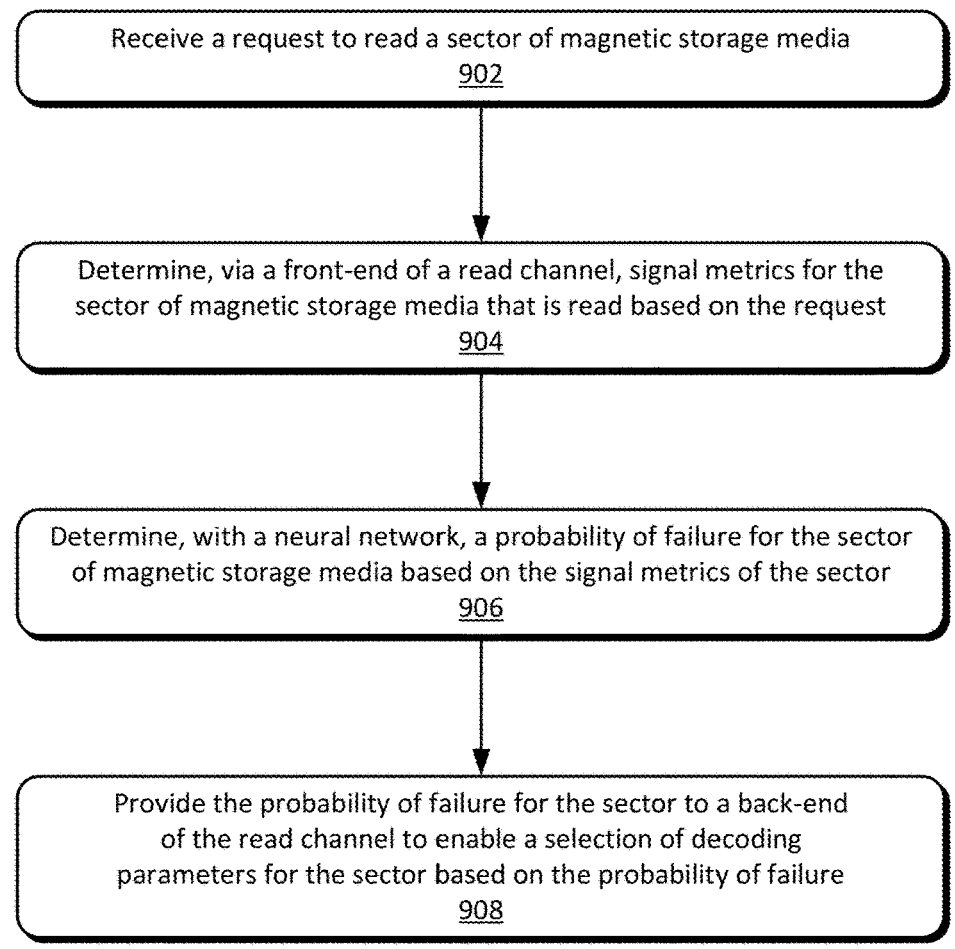
FIG. 9 depicts an example method for determining a probability of failure for a sector of magnetic storage media.

FIG. 9 depicts an example method 900 for determining a probability of failure for a sector of magnetic storage media, including operations performed by or with the analog front-end 302, media health manager 142, neural networks 144, and/or media health data 146.

At 902, a request to read a sector of magnetic storage media is received. The request may be received from a storage media controller associated with the media disk on which the sector resides. In some cases, the storage media controller requests that multiple sectors be read as part of a read command received from a host system or computing device.

At 904, signal metrics for the sector of magnetic storage media are received from a front-end of a read channel. The front-end of the read channel 140 may generate or have access to a wide variety of internal metrics, which may be useful in computing or determining a probability of sector failure. For example, the front-end metrics may include an indication of sync mark found, sync mark distribution, off-track detected, delta FAFIR filter taps, delta FIR-3T taps, baseline accumulator, frequency accumulator, mutual information from Vmm and NRZ, Vmm count with various thresholds, MSE computed from error signal, length of defect flags detected, delta gain change, delta ASC change, or other various metrics.

At 906, a probability of failure for the sector is determined with a neural network based on the signal metrics of the sector. The neural network 144 may be configured or pre-trained to determine for a probability of sector failure based on the signal metrics provided by the front-end.

At 908, the probability of failure for the sector is provided to a back-end of the read channel. The back-end may use the probability of sector failure to select decoding parameters for the sector to improve decoding, detection, or error-correcting operations of the back-end. In some cases, a back-end of the read channel may select a pipeline for decoding the sector that is more likely to succeed than a default progression through multiple pipelines as initial attempts of decoding the sector fail.

System-On-Chip

Figure 10:
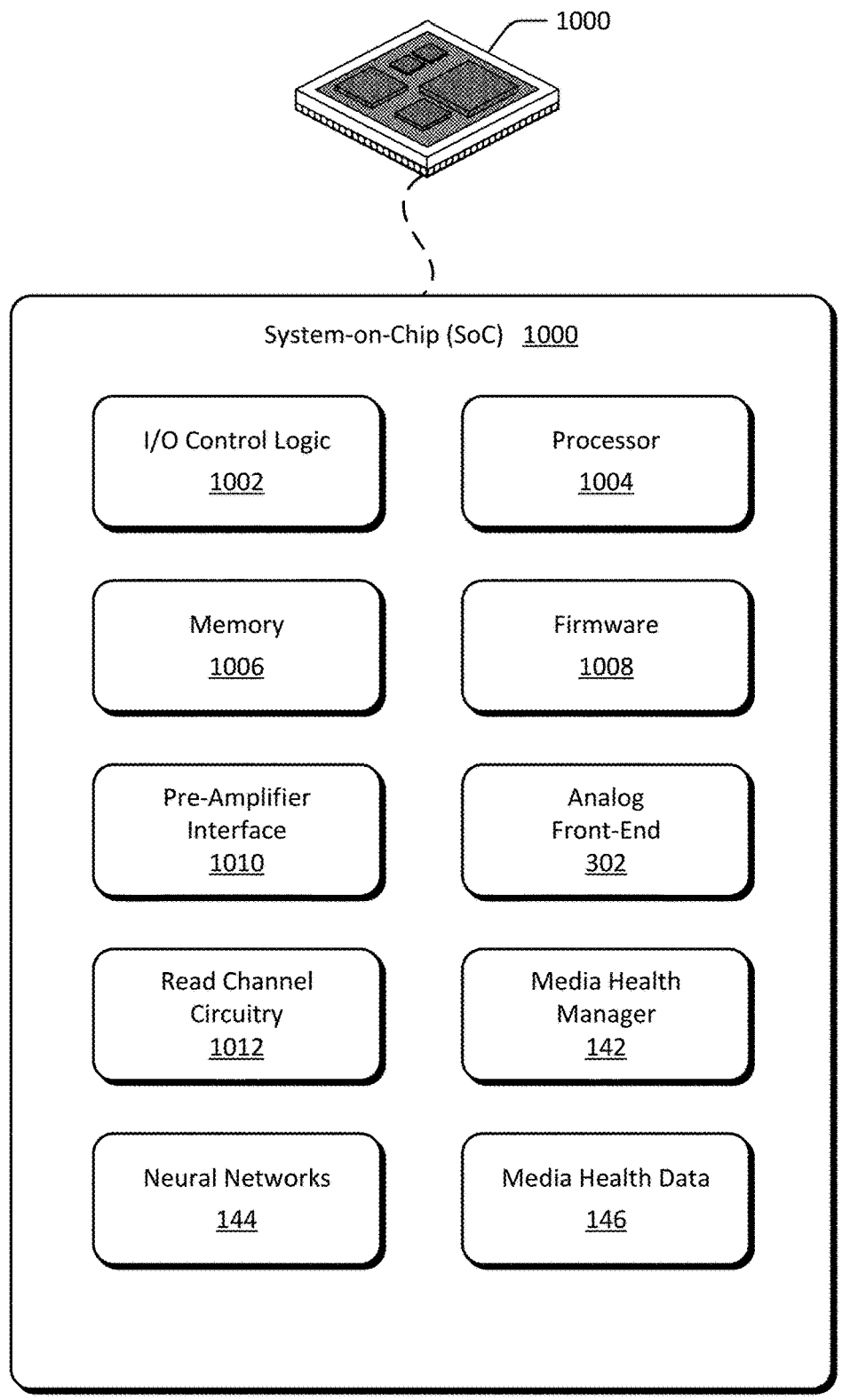
FIG. 10 illustrates an example System-on-Chip (SoC) environment for implementing aspects of health management for magnetic storage media.

FIG. 10 illustrates an exemplary System-on-Chip (SoC) 1000 that may implement various aspects of health management for magnetic storage media. The SoC 1000 may be implemented in any suitable device, such as a smart-phone, netbook, tablet computer, access point, network-attached storage, camera, smart appliance, printer, set-top box, server, solid-state drive (SSD), magnetic tape drive, hard-disk drive (HDD), storage drive array, memory module, storage media controller, storage media interface, head-disk assembly, magnetic media pre-amplifier, automotive computing system, or any other suitable type of device (e.g., others described herein). Although described with reference to a SoC, the entities of FIG. 10 may also be implemented as other types of integrated circuits or embedded systems, such as an application-specific integrated-circuit (ASIC), memory controller, a read channel component, storage controller, communication controller, application-specific standard product (ASSP), digital signal processor (DSP), programmable SoC (PSoC), system-in-package (SiP), or field-programmable gate array (FPGA).

The SoC 1000 may be integrated with electronic circuitry, a microprocessor, memory, input-output (I/O) control logic, communication interfaces, firmware, and/or software useful to provide functionalities of a computing device or magnetic storage system, such as any of the devices or components described herein (e.g., hard-disk drive). The SoC 1000 may also include an integrated data bus or interconnect fabric (not shown) that couples the various components of the SoC for data communication or routing between the components. The integrated data bus, interconnect fabric, or other components of the SoC 1000 may be exposed or accessed through an external port, parallel data interface, serial data interface, peripheral component interface, or any other suitable data interface. For example, the components of the SoC 1000 may access or control external storage media or magnetic read circuitry through an external interface or off-chip data interface.

In this example, the SoC 1000 is shown with various components that include input-output (I/O) control logic 1002 and a hardware-based processor 1004 (processor 1004), such as a microprocessor, processor core, application processor, DSP, or the like. The SoC 1000 also includes memory 1006, which may include any type and/or combination of RAM, SRAM, DRAM, non-volatile memory, ROM, one-time programmable (OTP) memory, multiple-time programmable (MTP) memory, Flash memory, and/or other suitable electronic data storage. In some aspects, the processor 1004 and code (e.g., firmware) stored on the memory 1006 are implemented as a read/write channel module or as part of a storage media interface to provide various functionalities associated with health management for magnetic storage media. In the context of this disclosure, the memory 1006 stores data, code, instructions, or other information via non-transitory signals, and does not include carrier waves or transitory signals. Alternatively or additionally, SoC 1000 may comprise a data interface (not shown) for accessing additional or expandable off-chip storage media, such as magnetic memory or solid-state memory (e.g., Flash or NAND memory).

The SoC 1000 may also include firmware 1008, applications, programs, software, and/or operating system, which may be embodied as processor-executable instructions maintained on the memory 1006 for execution by the processor 1004 to implement functionalities of the SoC 1000. In this example the SoC 1000 includes a pre-amplifier interface 1010 to receive signals corresponding to data read from sectors of magnetic storage media in accordance with one or more aspects. The SoC 1000 may also include other communication interfaces, such as a transceiver interface for controlling or communicating with components of a local on-chip (not shown) or off-chip communication transceiver. Alternatively or additionally, the transceiver interface may also include or implement a signal interface to communicate radio frequency (RF), intermediate frequency (IF), or base-band frequency signals off-chip to facilitate wired or wireless communication through transceivers, physical layer transceivers (PHYs), or media access controllers (MACs) coupled to the SoC 1000. For example, the SoC 1000 may include a transceiver interface configured to enable storage over a wired or wireless network, such as to provide a network attached storage (NAS) device with media health management features.

The SoC 1000 also includes an analog front-end 302 and read channel logic 1012 (e.g., front end section) for processing signals received from a pre-amplifier through the pre-amplifier interface 1010. Generally, the analog front-end 302 conditions and samples a read signal (e.g., a read-back continuous time signal) provided by the pre-amplifier. The read channel logic 1012 may include any suitable combination of an equalizer module, a detector module, an adaptation module, or a gain module for detection, equalization, and decoding of data from read signals received from the pre-amplifier. In some aspects, the SoC 1000 includes a media health manager 142, neural networks 144, and media health data 146, which may be implemented separately as shown or combined with a processing component or data interface. Alternatively or additionally, the SoC 1000 may include interfaces to a storage media controller or a spindle/motor assembly of a magnetic media disk drive.

As described herein, the media health manager may receive read metrics from a read channel (e.g., internal read channel or analog front-end metrics) and determine or update health scores of magnetic storage media zones based on the metrics and/or using a neural network to implement aspects of health management for magnetic storage media. Any of these entities may be embodied as disparate or combined components, as described with reference to various aspects presented herein. Examples of these components and/or entities, or corresponding functionality, are described with reference to the respective components or entities of the environment 100 of FIG. 1 or respective configurations illustrated in FIGS. 2-5. The media health manager 142, either in whole or part, may be implemented as digital logic, circuitry, and/or processor-executable instructions maintained by the memory 1006 and executed by the processor 1004 to implement various aspects or features of health management for magnetic storage media.

The media health manager 142, may be implemented independently or in combination with any suitable component or circuitry to implement aspects described herein. For example, media health manager may be implemented as part of a DSP, processor/storage bridge, I/O bridge, graphics processing unit, memory controller, storage controller, arithmetic logic unit (ALU), or the like. The media health manager 142 may also be provided integral with other entities of SoC 1000, such as integrated with the processor 1004, memory 1006, a storage media interface, or firmware 1008 of the SoC 1000. Alternatively or additionally, the media health manager 142, and/or other components of the SoC 1000 may be implemented as hardware, firmware, fixed logic circuitry, or any combination thereof.

Figure 11:
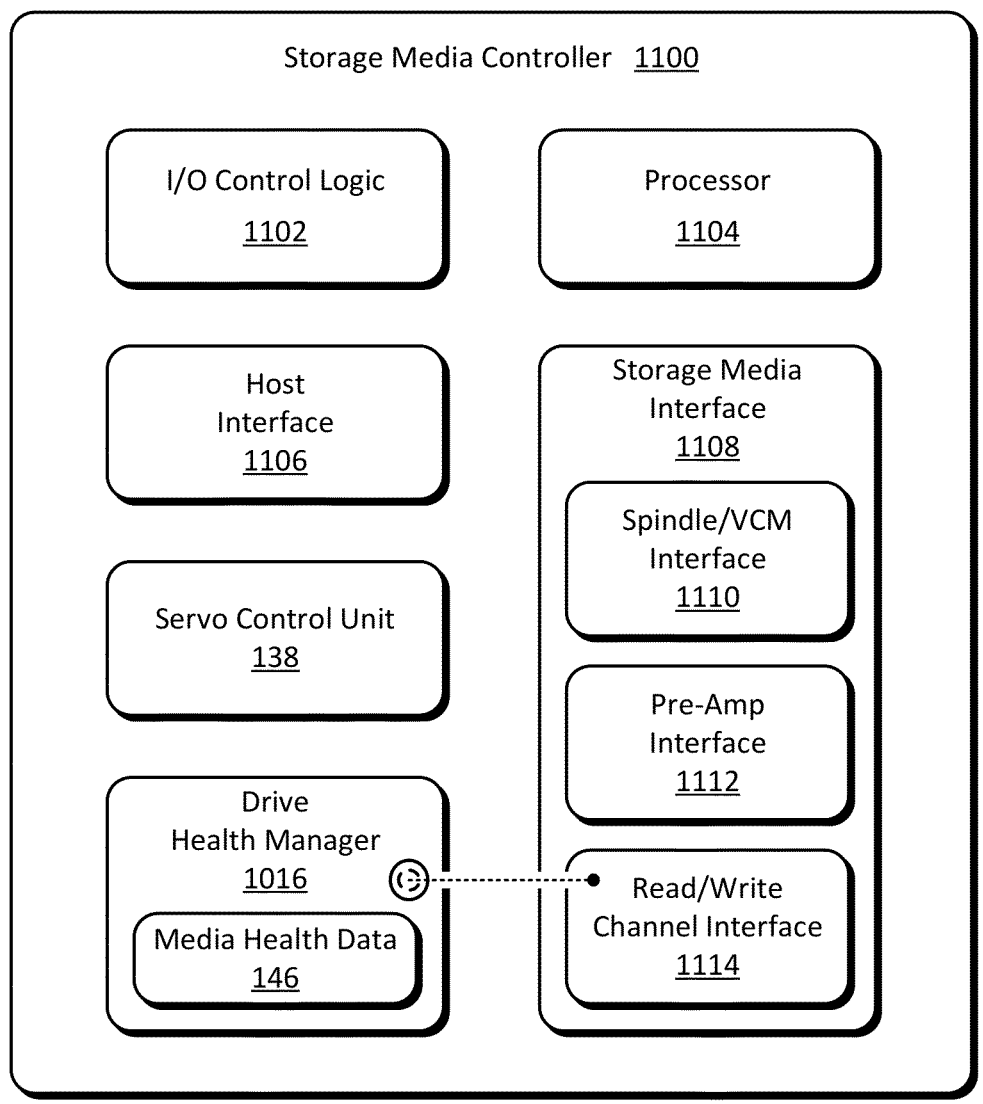
FIG. 11 illustrates an example storage media controller configured to implement aspects of health management in a storage media drive with which the controller is associated.

As another example, consider FIG. 11 which illustrates an example storage media controller 1100 in accordance with one or more aspects of health management for magnetic storage media. Generally, the storage media controller 1100 enables the computing device 102 to access contents of magnetic storage media, such as an operating system, applications, or data for applications or other services. The storage media controller may also write and read data of the computing device 102 to and from the magnetic storage media with which the controller is associated.

In various aspects, the storage media controller 1100 or any combination of components thereof may be implemented as a storage drive controller (e.g., HDD controller or HDD chipset), storage media controller, NAS controller, storage media interface, storage media endpoint, storage media target, or a storage aggregation controller for magnetic storage media, solid-state storage media, or the like (e.g., hybrid SSD/HDD storage systems). In some cases, the storage media controller 1100 is implemented similarly to or with components of the SoC 1000 as described with reference to FIG. 10 or FIG. 1 (e.g., storage media controller 136). In other words, an instance of the SoC 1000 may be configured as a storage media controller (or sub-system of the controller), such as the storage media controller 1100 to manage magnetic storage media. In this example, the storage media controller 1100 includes input-output (I/O) control logic 1102 and a processor 1104, such as a microprocessor, microcontroller, processor core, application processor, DSP, or the like. The storage media controller also includes a host interface 1106 (e.g., SATA, PCIe, NVMe, or Fabric interface) and a storage media interface 1108 (e.g., magnetic media interface or head-disk assembly (HDA) interface), which enable access to a host system (or fabric) and storage media, respectively. In this example, the storage media interface includes separate instances of a spindle/VCM interface 1110, a pre-amp interface 1112, and read/write channel interface 1114, such as to enable communication with a head-disk assembly and read channel of a media drive. As shown in FIG. 11, the storage media controller 1100 may also include a servo control unit 138. In some cases, the servo control unit is operably coupled to the spindle interface 1110 and provides spindle or voice coil control for media drive operation.

In some aspects, the storage media controller 1100 implements aspects of health management for magnetic storage media when managing or enabling access to storage media (e.g., media disks) that is coupled to the storage media interface 1108. In this example, the storage media controller 1100 includes a drive health manager 1016 that may include media health data 146 for multiple zones of magnetic storage media. In some aspects, the drive health manager 1016 receives read metrics or zone health scores from a read/write channel through the read/write channel interface 1114. Using the read metrics or zone health scores from multiple media disks or media disk surfaces, the drive health manager 1016 may determine or update a health score for magnetic storage media (e.g., multiple disks) of a media drive (e.g., an overall health score for a HDD). Thus, the drive health manager 1016 may monitor and track respective health scores across multiple disks or surfaces of magnetic storage media of the media drive. Alternatively or additionally, the drive health manager 1016 may manage access to particular disks or surfaces based on a respective health score of those disks or surfaces. For example, if one disk of a media drive has a poor health score, the drive health manager 1016 may direct data access to other disks (e.g., with better health scores) of the media drive to improve data reliability and availability (e.g., uptime) of the media drive. In some aspects, the processor 1104 and firmware or logic of the storage media controller 1100 are implemented to provide various data writing or processing functionalities associated with health management for magnetic storage media.

The drive health manager 1016 of the storage media controller 1100 may be implemented separately as shown or combined with the processor 1104, read/write channel interface 1114, or storage media interface 1108. In accordance with various aspects, the drive health manager 1016 may receive zone health scores from a read channel through the read/write channel interface 1114, signal metrics from a pre-amplifier through the pre-amp interface 1112, or electro-mechanical metrics from a spindle and VCM assembly from the spindle/VCM interface 1110. The drive health manager 1016 may compile the zone health scores, signal metrics, and/or electro-mechanical metrics and compute an overall media drive health score for a HDD in which the storage media controller 1100 is embodied. This media drive health score may indicate an overall amount of wear on internal components of the HDD or a reliability of the HDD, enabling replacement of the HDD or data migration (or redirection) to another HDD before the HDD fails. Examples of these components and/or entities, or corresponding functionality, are described with reference to the respective components or entities of the environment 100 of FIG. 1 or respective configurations illustrated in FIGS. 2-5. The drive health manager 1016 (or media health manager 142), either in whole or part, may be implemented as processor-executable instructions maintained by memory of the controller and executed by the processor 1104 to implement various aspects and/or features of health management for magnetic storage media.

Although the subject matter has been described in language specific to structural features and/or methodological operations, it is to be understood that the subject matter defined in the appended claims is not necessarily limited to the specific examples, features, or operations described herein, including orders in which they are performed.

What is claimed is:

1. A method for managing health of magnetic storage media of a storage media drive, comprising:
   receiving a request to read a sector of the magnetic storage media that resides in a zone of the magnetic storage media, the zone comprising multiple sectors of the magnetic storage media;
   determining, with a read channel of the storage media drive, read metrics for the sector of the magnetic storage media that is read based on the request;
   accessing read metrics of the zone of the magnetic storage media, the read metrics of the zone including respective read metrics for the sector that is read and others of the multiple sectors of the zone of the magnetic storage media;
   updating the read metrics of the zone of the magnetic storage media based on the read metrics determined for the sector of the magnetic storage media to provide updated read metrics for the zone of the magnetic storage media, the updating of the read metrics of the zone comprising updating the respective read metrics of the sector that is read based on the read metrics determined for the sector; and
   determining, with a neural network, a health score for the zone of the magnetic storage media in which the sector resides based on the updated read metrics of the zone of the magnetic storage media.

2. The method of claim 1, further comprising:
   storing the health score of the zone of the magnetic storage media to a table of zone information; or
   transmitting the health score of the zone of the magnetic storage media to a storage media controller of the storage media drive.

3. The method of claim 1, wherein:
   accessing the read metrics for the zone of the magnetic storage media comprises reading respective averages of the read metrics from a table of zone information; and
   updating the read metrics for the zone of the magnetic storage media comprises updating the respective averages of the read metrics based on the read metrics determined for the sector of the magnetic storage media.

4. The method of claim 3, wherein:
   the respective averages of the read metrics include respective short-term averages of the read metrics and respective long-term averages of the read metrics; and
   updating the read metrics for the zone of the magnetic storage media comprises updating the respective short-term averages of the read metrics and the respective long-term averages of the read metrics based on the read metrics determined for the sector of the magnetic storage media.

5. The method of claim 1, further comprising:
   receiving electro-mechanical metrics for the storage media drive from a spindle and voice coil motor assembly of the storage media drive; or
   receiving signal metrics for the storage media drive from a pre-amplifier of the storage media drive; and
   determining a drive health score for the storage media drive based on at least two of the health score of the zone, the electro-mechanical metrics, or the signal metrics.

6. The method of claim 1, wherein the health score for the zone of the magnetic storage media is indicative of a level of wear, a level of degradation, or a level of reliability of the zone of the magnetic storage media.

7. The method of claim 1, wherein the zone of the magnetic storage media corresponds to a first subset of at least three subsets of tracks on a platter surface of a magnetic storage media disk.

8. The method of claim 1, wherein the read metrics for the sector of the magnetic storage media include one or more of an unrecovered sector rate, an average retry method rate, an average of off-track detections, an average number of seek errors, an average number of errors corrected by error-correcting code (ECC), an average syndrome weight in ECC, an average number of ECC iterations, an average of log likelihood ratio (LLR) probability density function (PDF) statistics, an average mean square error (MSE) of front-end loop signals, an average length of detected media defects, an average length of analog-to-digital converter (ADC) saturation, an average delta of an adaptive parameter, or an average of sync mark errors.

9. The method of claim 1, wherein the neural network includes a pre-trained neural network that is configured to map the read metrics of the read channel to one of at least three health score classifications to determine the health score for the zone of the magnetic storage media.

10. An apparatus comprising:
    an interface to communicate data with a host;
    a disk of magnetic storage media to store the data;
    a read channel to read the data from sectors of the magnetic storage media;
    a neural network to determine media health scores; and
    a media health manager configured to:
      determine, with the read channel, read metrics for a sector of the magnetic storage media from which the data is read;
      determine, from multiple zones of the magnetic storage media, a zone of the magnetic storage media in which the sector resides, each zone of the magnetic storage media corresponding to a respective subset of tracks on the disk of the magnetic storage media;
      access read metrics of the zone of the magnetic storage media, the read metrics of the zone of the magnetic storage media including respective read metrics for the sector from which the data is read and multiple others of the sectors of the zone of the magnetic storage media;
      update the read metrics of the zone of the magnetic storage media based on the read metrics determined for the sector of the magnetic storage media to provide updated read metrics for the zone of the magnetic storage media, the updating of the read metrics comprising updating the respective read metrics of the sector from which the data is read based on the read metrics determined for the sector; and
      determine, with the neural network, a health score for the zone of the magnetic storage media in which the sector resides based on the updated read metrics of the zone of the magnetic storage media.

11. The apparatus of claim 10, wherein the media health manager is further configured to:
    store the health score of the zone of the magnetic storage media to a table of zone information; or transmit the health score of the zone of the magnetic storage media to a storage media controller of the apparatus.

12. The apparatus of claim 10, wherein:
to access the read metrics for the zone of the magnetic storage media, the media health manager is further configured to read respective averages of the read metrics from a table of zone information; and
to update the read metrics for the zone of the magnetic storage media, the media health manager is further configured to update the respective averages of the read metrics based on the read metrics determined for the sector of the magnetic storage media.

13. The apparatus of claim 10, wherein the apparatus further comprises:
a spindle and voice coil motor assembly associated with the disk of the magnetic storage media;
a pre-amplifier configured to amplify a read signal generated by a read head associated with the disk of the magnetic storage media; and
the media health manager is further configured to:
receive electro-mechanical metrics for the disk of the apparatus from the spindle and voice coil motor assembly; or
receive signal metrics for the disk of the apparatus from the pre-amplifier; and
determine a health score for the apparatus based on at least two of the health score of the zone of the magnetic storage media, the electro-mechanical metrics, or the signal metrics.

14. The apparatus of claim 10, wherein the read metrics for the sector of the magnetic storage media include one or more of an unrecovered sector rate, an average retry method rate, an average of off-track detections, an average number of seek errors, an average number of errors corrected by error-correcting code (ECC), an average syndrome weight in ECC, an average number of ECC iterations, an average of log likelihood ratio (LLR) probability density function (PDF) statistics, an average mean square error (MSE) of front-end loop signals, an average length of detected media defects, an average length of analog-to-digital converter (ADC) saturation, an average delta of an adaptive parameter, or an average of sync mark errors.

15. The apparatus of claim 10, wherein the neural network includes a pre-trained neural network that is configured to map the read metrics of the read channel to one of at least three health score classifications to determine the health score for the zone of the magnetic storage media.

16. A System-on-Chip (SoC) comprising:
a pre-amplifier interface to receive signals corresponding to data read from sectors of magnetic storage media;
read channel logic to process the signals corresponding to the data read from the sectors of the magnetic storage media;
a hardware-based processor;
a memory storing processor-executable instructions that, responsive to execution by the hardware-based processor, implement a media health manager to:
determine, with the read channel logic, read metrics for a sector of the magnetic storage media from which the data is read;
determine, from multiple zones of the magnetic storage media, a zone of magnetic storage media in which the sector resides, each zone of the magnetic storage media corresponding to a respective subset of tracks on a disk of the magnetic storage media;
access read metrics of the zone of the magnetic storage media, the read metrics of the zone of the magnetic storage media including respective read metrics for the sector from which the data is read and multiple others of the sectors of the zone of the magnetic storage media;
update the read metrics of the zone of the magnetic storage media based on the read metrics determined for the sector of the magnetic storage media to provide updated read metrics for the zone of the magnetic storage media, the updating of the read metrics comprising updating the respective read metrics of the sector from which the data is read based on the read metrics determined for the sector; and
determine, with the neural network, a health score for the zone of the magnetic storage media in which the sector resides based on the updated read metrics of the zone of the magnetic storage media.

17. The SoC of claim 16, wherein the media health manager is further implemented to:
store the health score of the zone of the magnetic storage media to a table of zone information; or
transmit the health score of the zone of the magnetic storage media to a storage media controller of the apparatus.

18. The SoC of claim 16, wherein:
to access the read metrics for the zone of the magnetic storage media, the media health manager is further implemented to read respective averages of the read metrics from a table of zone information; and
to update the read metrics for the zone of the magnetic storage media, the media health manager is further implemented to update the respective averages of the read metrics based on the read metrics determined for the sector of the magnetic storage media.

19. The SoC of claim 16, wherein the read metrics for the sector of the magnetic storage media include one or more of an unrecovered sector rate, an average retry method rate, an average of off-track detections, an average number of seek errors, an average number of errors corrected by error-correcting code (ECC), an average syndrome weight in ECC, an average number of ECC iterations, an average of log likelihood ratio (LLR) probability density function (PDF) statistics, an average mean square error (MSE) of front-end loop signals, an average length of detected media defects, an average length of analog-to-digital converter (ADC) saturation, an average delta of an adaptive parameter, or an average of sync mark errors.

20. The SoC of claim 16, wherein the neural network includes a pre-trained neural network that is configured to map the read metrics of the read channel to one of at least five health score classifications to determine the health score for the zone of the magnetic storage media.

* * * * *